United States Patent [19]

Adler et al.

[11] Patent Number: 4,973,280

[45] Date of Patent: Nov. 27, 1990

[54] METHOD AND APPARATUS FOR MAKING FLAT TENSION MASK COLOR CATHODE RAY TUBES

[75] Inventors: Robert Adler, Northfield; James R. Fendley, Arlington Heights; Howard G. Lange, Prospect Heights; Charles J. Prazak, Elmhurst; Johann Steiner, Des Plaines; Paul Strauss, Chicago, all of Ill.

[73] Assignee: Zenith Electronics Corporation, Glenview, Ill.

[21] Appl. No.: 370,204

[22] Filed: Jun. 22, 1989

Related U.S. Application Data

[63] Continuation-in-part of Ser. No. 223,475, Jul. 22, 1988, Pat. No. 4,902,257.

[51] Int. Cl.$^5$ .................... B23K 9/00

[52] U.S. Cl. .................... 445/3; 445/30

[58] Field of Search .................... 445/3, 30, 63, 6

[56] References Cited

U.S. PATENT DOCUMENTS

| | | | |
|---|---|---|---|
| 2,625,734 | 1/1953 | Law | 445/4 |
| 2,733,366 | 1/1956 | Grimm et al. | 313/402 |
| 3,437,482 | 4/1969 | Yamada et al. | 430/5 |
| 3,451,812 | 6/1969 | Tamura | 430/5 |
| 3,494,267 | 2/1970 | Schwartz | 430/23 |
| 3,563,737 | 2/1971 | Jonkers | 430/5 |
| 3,638,063 | 1/1971 | Tachikawa et al. | 313/348 |
| 3,674,488 | 7/1972 | Dodd | 430/5 X |
| 3,676,914 | 7/1972 | Fiore | 445/47 |
| 3,690,881 | 9/1972 | King | 430/5 X |
| 3,768,385 | 10/1973 | Noguchi | 430/5 |
| 3,889,329 | 6/1975 | Fazlin | 445/30 |
| 3,894,321 | 7/1975 | Moore | 313/402 X |
| 3,983,613 | 10/1976 | Palac et al. | 445/52 |
| 3,989,524 | 11/1976 | Palac | 430/5 |
| 4,593,224 | 6/1986 | Palac | 430/5 |
| 4,604,071 | 8/1986 | Pons | 445/4 |
| 4,692,660 | 9/1987 | Adler et al. | 445/23 |
| 4,695,761 | 9/1987 | Fendley | 313/407 |
| 4,802,874 | 2/1989 | Yasuda et al. | 445/4 |

FOREIGN PATENT DOCUMENTS

| | | | |
|---|---|---|---|
| 1477706 | 3/1967 | France . | |
| 19646 | 2/1979 | Japan | 445/3 |
| 155443 | 12/1980 | Japan | 445/3 |
| 142730 | 8/1983 | Japan | 445/3 |
| 237340 | 10/1986 | Japan | 445/30 |
| 2052148 | 6/1979 | United Kingdom . | |

*Primary Examiner*—Kenneth J. Ramsey

[57] ABSTRACT

Process and apparatus are disclosed for use in the manufacture of a color cathode ray tube having a shadow mask with a central pattern of apertures mounted in tension on a transparent flat front panel. The mask aperture pattern is registered with a catholdoluminescent screen pattern of corresponding geometry and position on an inner surface of the panel. The shadow masks and front panels are respectively interchangeable. Signals are developed which are indicative of the positions of a mechanically stretched mask aperture pattern and an associated front panel screen pattern relative to a reference or to each other. Responsive to such signals, there is effected a relative positioning of the mask and screen until registration between the patterns is achieved.

41 Claims, 13 Drawing Sheets

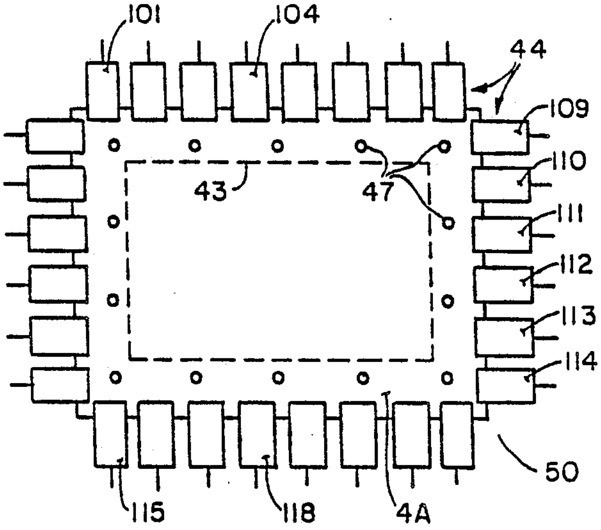
FIG. 5
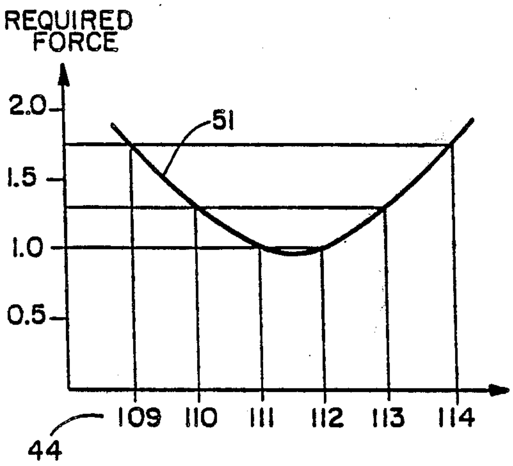
FIG. 6
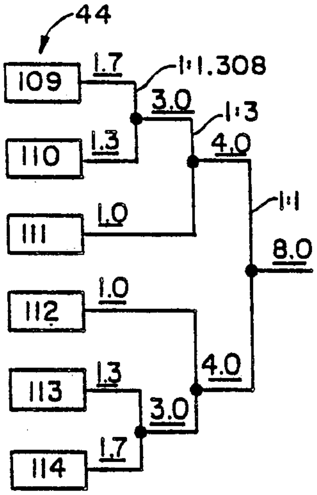
FIG. 7
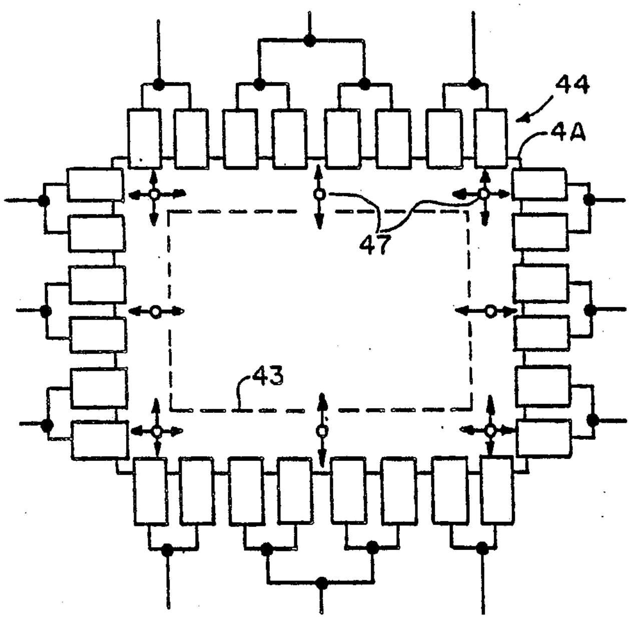
FIG. 8a
FIG. 8

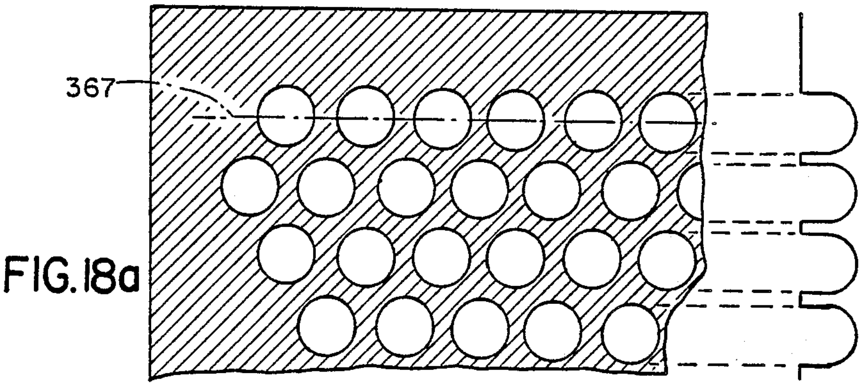
FIG. 18a
FIG. 18c
FIG. 18b
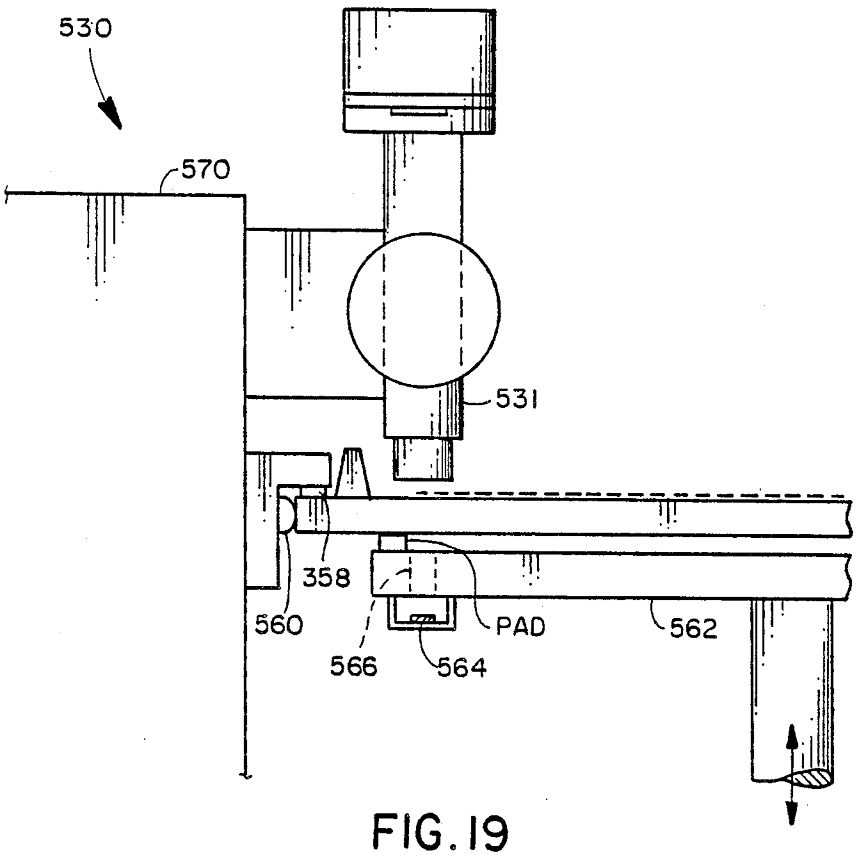
FIG. 19

FIG.24a
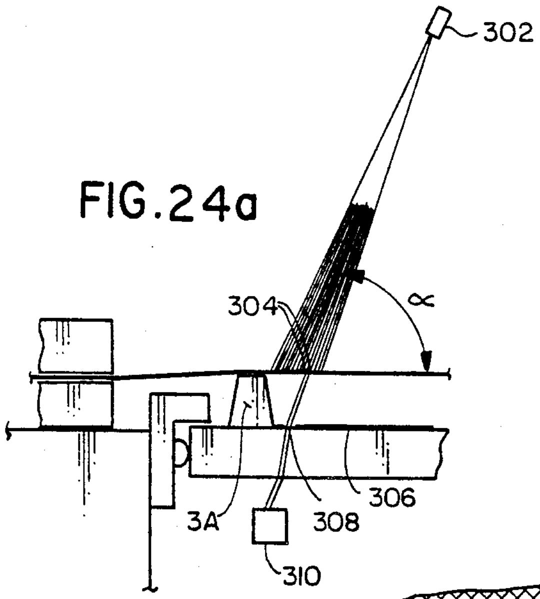
FIG.24b
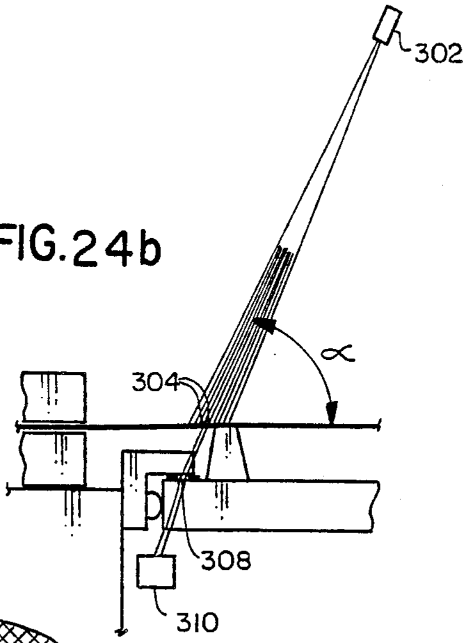
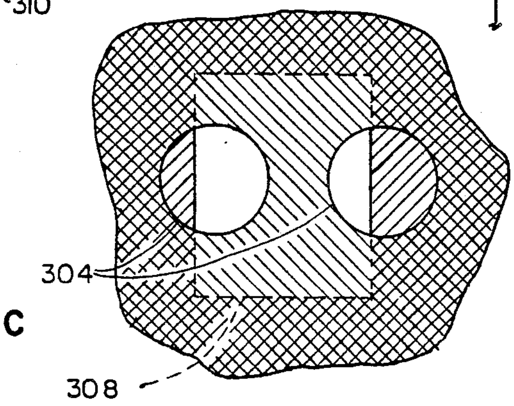
FIG.24c
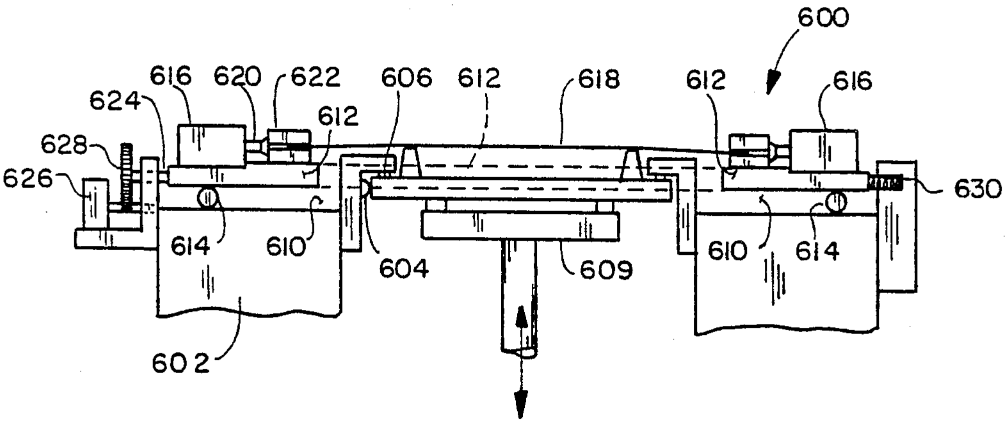
FIG. 25

METHOD AND APPARATUS FOR MAKING FLAT TENSION MASK COLOR CATHODE RAY TUBES

CROSS REFERENCE TO RELATED APPLICATIONS

This application is a continuation-in-part of application Ser. No. 223,475 filed July 22, 1988, now U.S. Pat. No. 4,902,257, issued Feb. 20, 1990 and is related to, but in no way dependent upon, application Ser. No. 058,095, filed June 4, 1987, now U.S. Pat. No. 4,828,523 of common ownership herewith.

BACKGROUND OF THE INVENTION

Field of the Invention

The invention applies to the manufacture of flat tension mask color cathode ray tubes. More specifically, the invention provides means for achieving registration of the aperture patterns of flat tension shadow masks and related cathodoluminescent screens.

In particular, the invention relates to a portion of the process steps employed in the manufacture of the faceplate assembly of a flat tension mask color cathode ray tube. The faceplate assembly includes a glass front panel, a support structure on the inner surface of the panel, and a tensed foil shadow mask affixed to the support structure.

In this specification, the terms "grille" and "screen" are used, and apply generally to the pattern on the inner surface of the front panel. The grille, also known as the black surround, or blank matrix, is widely used to enhance contrast. It is applied to the panel first. It comprises a dark coating on the panel in which holes are formed to permit passage of light, and over which the respective colored-light-emitting phosphors are deposited to form the screen.

The holes in the grille must register with the columns of electrons passed by the holes or slots in the shadow mask. This is the primary registration requirement in a grille-equipped tube; the phosphor deposits may overlap the grille holes, hence their registration requirements are less precise.

In tubes without a grille, on the other hand, it is the phosphor deposits which must register with the columns of electrons. The word "screen," when used in the context of registration, therefore includes the grille where a grille is employed, as well as the phosphor deposits when there is no grille.

Problems in The Conventional Manufacturing Process

Historically, color cathode ray tubes have been manufactured by requiring that a shadow mask dedicated to a particular panel follow the panel through various stages of the manufacturing process. Such a procedure is more complex than might be obvious; a complex conveyer system is needed to maintain the marriage of each mask assembly to its associated panel throughout the manufacturing process. In several stages of the process, the panel must be separated from the mask, and the mating shadow mask cataloged for later reunion with its panel mate.

With the recent commercial introduction of the flat tension mask cathode ray tube, many process problems related to the curvature of the mask and panel have been alleviated or reduced. Necessarily, however, initial production of flat tension mask tubes has been based on continued use of the proven technology of mating a dedicated mask to a specific front panel throughout the manufacturing process. However, because the flat tension mask requires tension forces during the manufacturing process as well as after installation in a tube, somewhat cumbersome in-process support frames become necessary. These frames introduce complexity and expense in the manufacture of color cathode ray tubes of the tension mask type.

Thus the desirability of simplifying the conventional production process remains as great as ever in the manufacture of cathode ray tubes of the flat tension mask type.

It has been recognized that color tube manufacture would be simplified if any mask could be registered with any screen (commonly termed an "interchangeable" mask), so that masks and screens would no longer have to be individually mated. Yet to this day, no commercially viable approach suitable for achieving such component interchangeability has been implemented or disclosed.

Known Prior Art

U.S. Pat. No. 2,625,734, Law
U.S. Pat. No. 2,733,366, Grimm
U.S. Pat. No. 3,437,482, Yamada et al.
U.S. Pat. No. 3,451,812, Tamura
U.S. Pat. No. 3,494,267, Schwartz
U.S. Pat. No. 3,563,737, Jonkers
U.S. Pat. No. 3,638,063, Tachikawa
U.S. Pat. No. 3,676,914, Fiore
U.S. Pat. No. 3,768,385, Noguchi
U.S. Pat. No. 3,889,329, Fazlin
U.S. Pat. No. 3,894,321, Moore
U.S. Pat. No. 3,983,613, Palac
U.S. Pat. No. 3,989,524, Palac
U.S. Pat. No. 4,593,224, Palac
U.S. Pat. No. 4,692,660, Adler
U.S. Pat. No. 4,695,761, Fendley
FR1,477,706, Gobain
GB2,052,148, Sony
20853/65, Japanese Article "Improvements in the RCA Three Beam Shadow-Mask Color Kinescope, " Grimes, 1954, Proceedings of the IRE, January, 1954, pgs. 315-326.

OBJECTS OF THE INVENTION

It is an object of this invention to provide manufacturing apparatus and process for color cathode ray tubes of the flat tension mask type wherein shadow masks and front panels are respectively interchangeable during mask-panel assembly.

It is also an object of the invention to provide a method for achieving practical interchangeability of shadow masks in the manufacture of flat tension mask color cathode ray tubes by providing automatic means for adjusting the position size and/or shape of a mask such that its aperture pattern is brought into registration with a screen pattern.

It is a further object to provide such method and apparatus which compensates for screen position and geometry errors.

It is an object of this invention to provide, in a manufacturing process for color cathode ray tubes of the flat tension mask type wherein shadow masks and front panels are respectively interchangeable during mask-panel assembly, a method and associated apparatus for changing a geometrical parameter of the mask pattern to achieve coincidence with a screen pattern.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings (noted as being not to scale), in the several figures of which like reference numerals identify like elements, and in which:

FIG. 5 is a plan view of a fixture enclosing an in-process shadow mask for adjusting the size, position, and/or shape of the mask in accordance with the principles of this invention;

FIG. 6 is a curve representing the distribution of required forces along one edge of the mask shown in FIG. 5;

FIG. 7 depicts schematically the use of levers for distributing forces along the edges of a mask shown in FIG. 5;

Figure 8B:
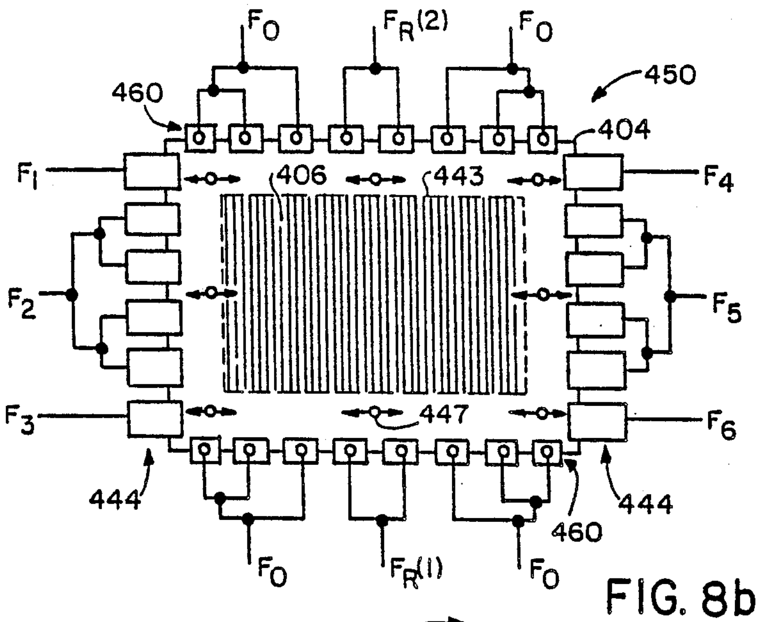
Figure 8C:
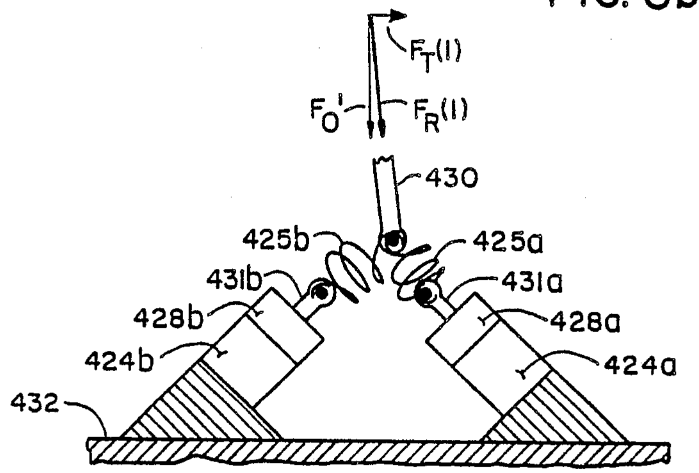
Figure 9:
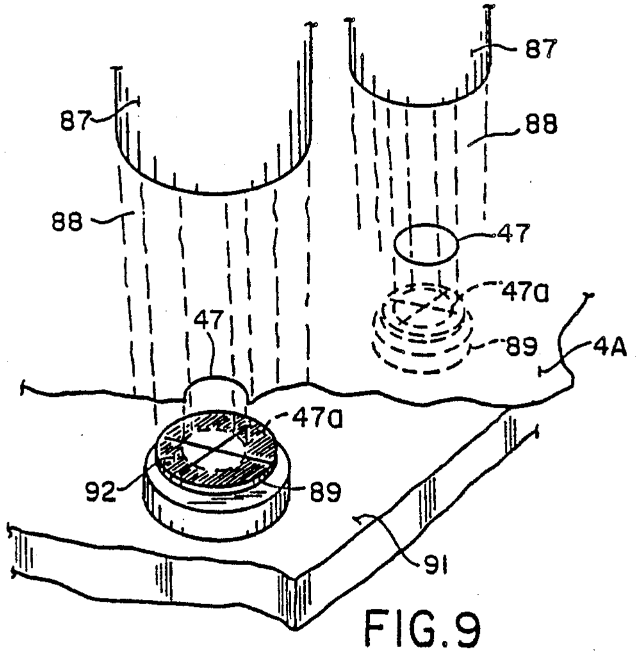
Figure 10:
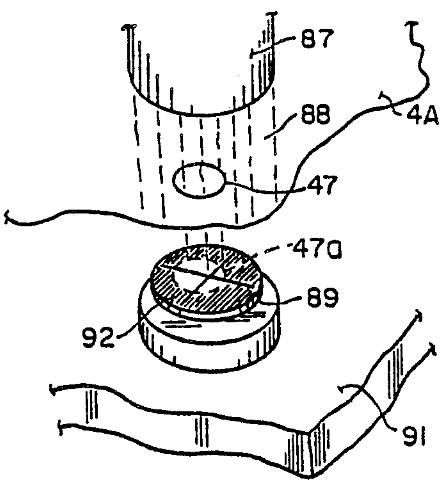
Figure 11:
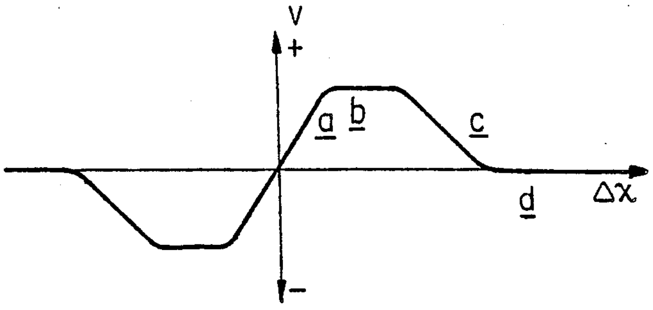
Figure 12:
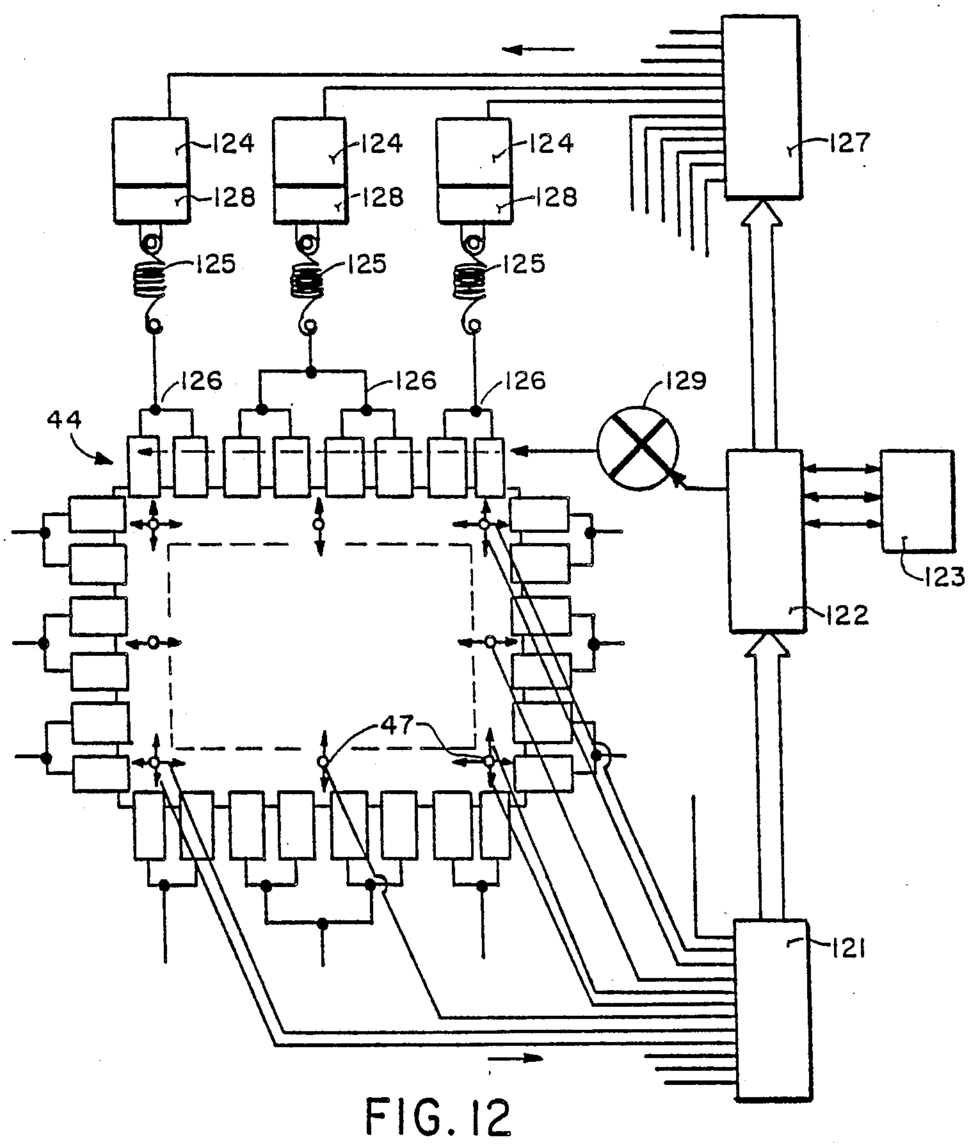
Figure 13A:
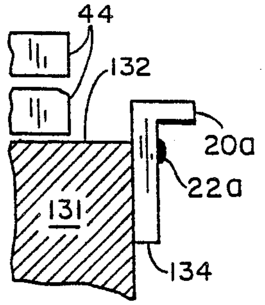
Figure 13B:
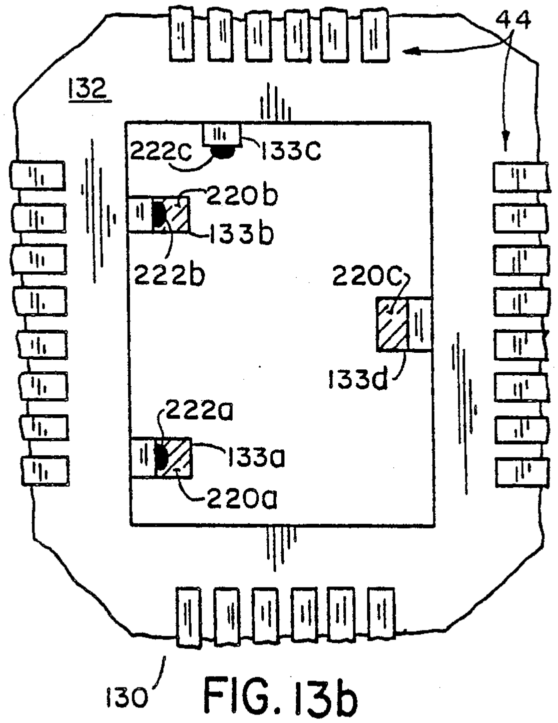
Figure 14A:
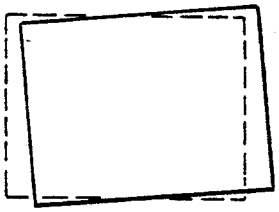
Figure 14B:
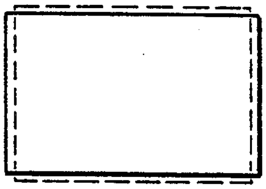
Figure 15:
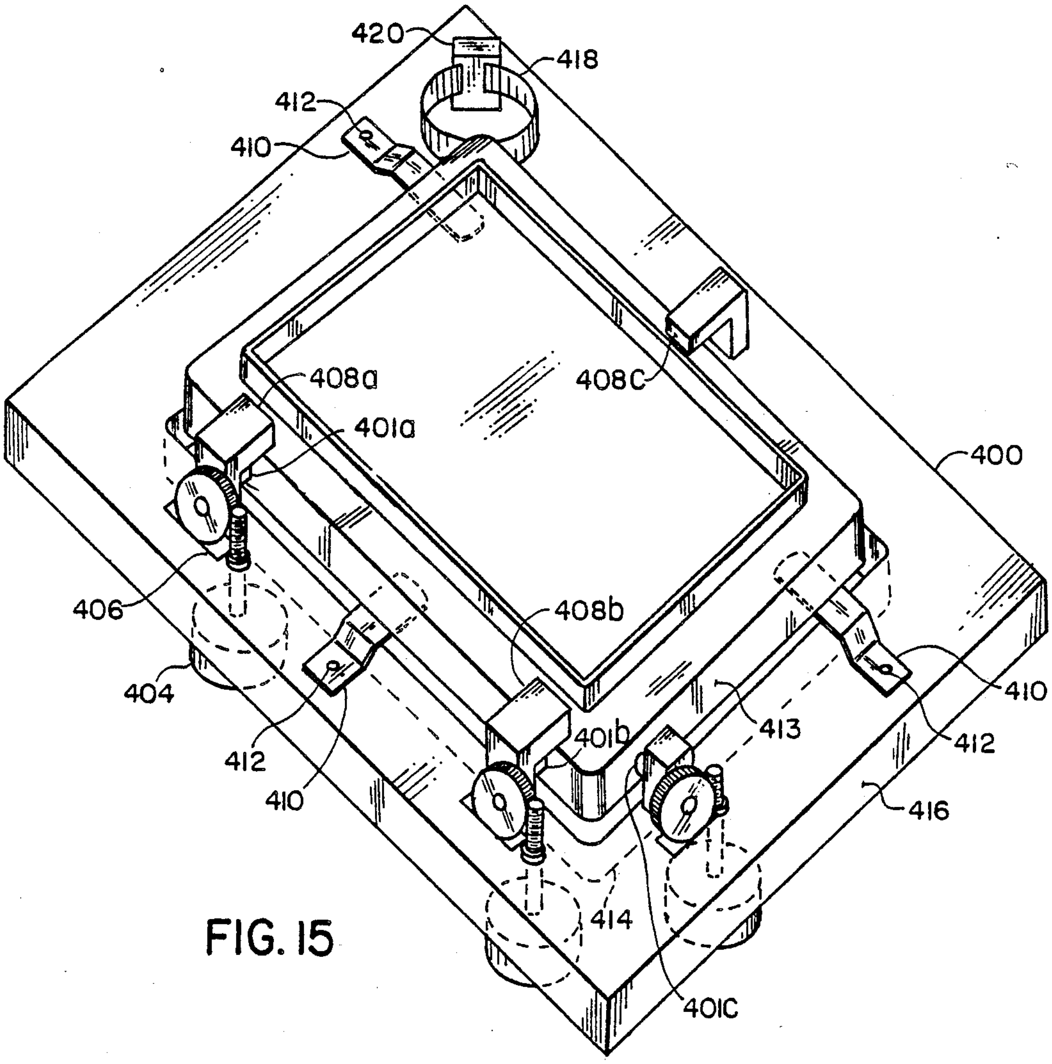
Figure 16:
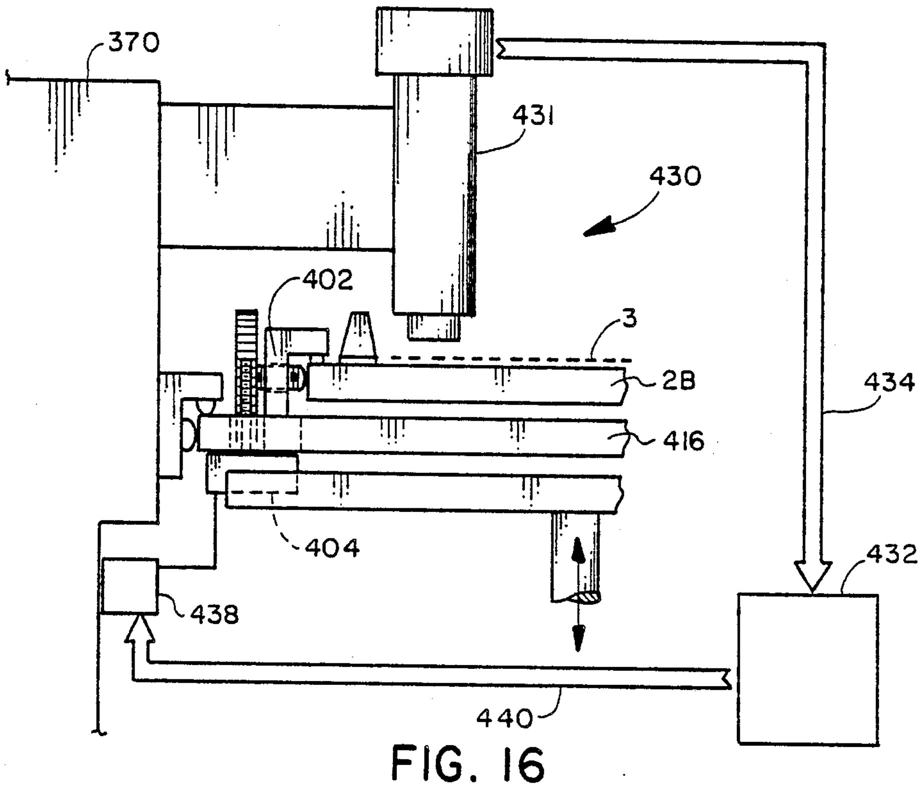
Figure 17:
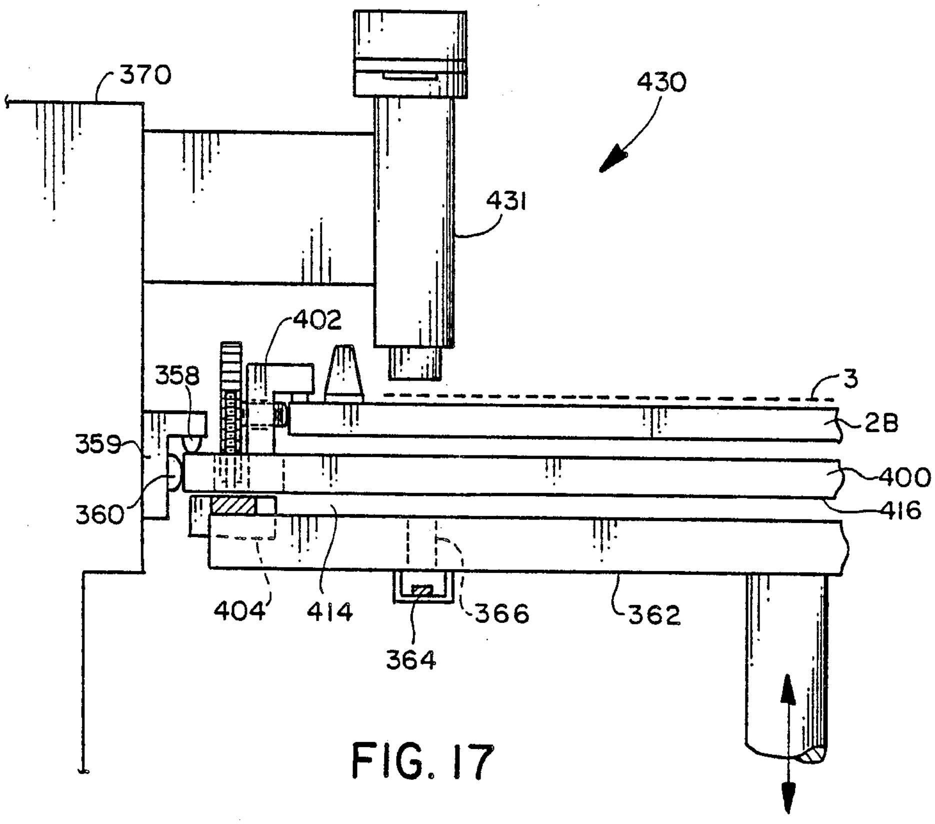
Figure 20:
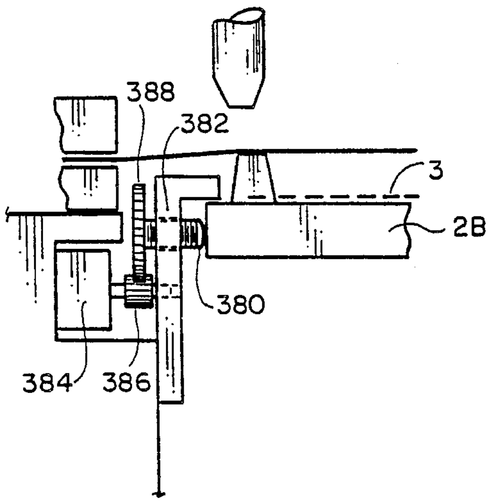
Figure 22:
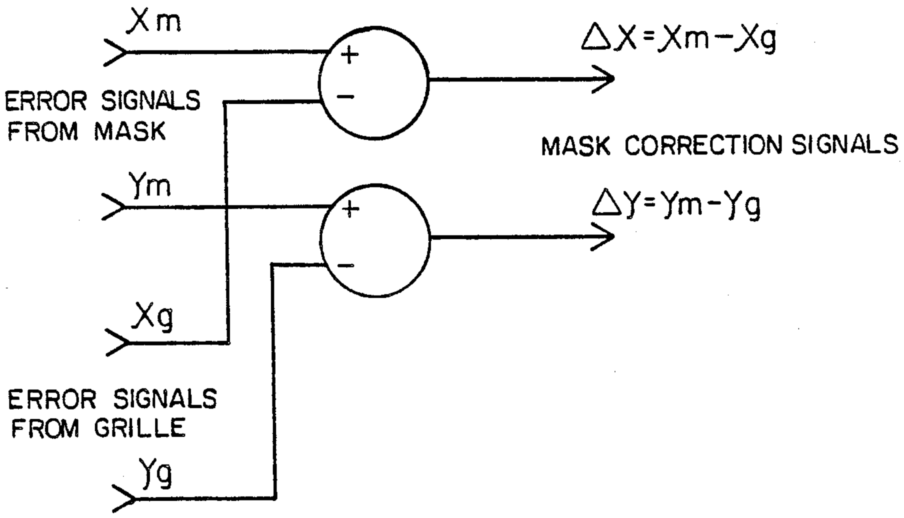
Figure 21A:
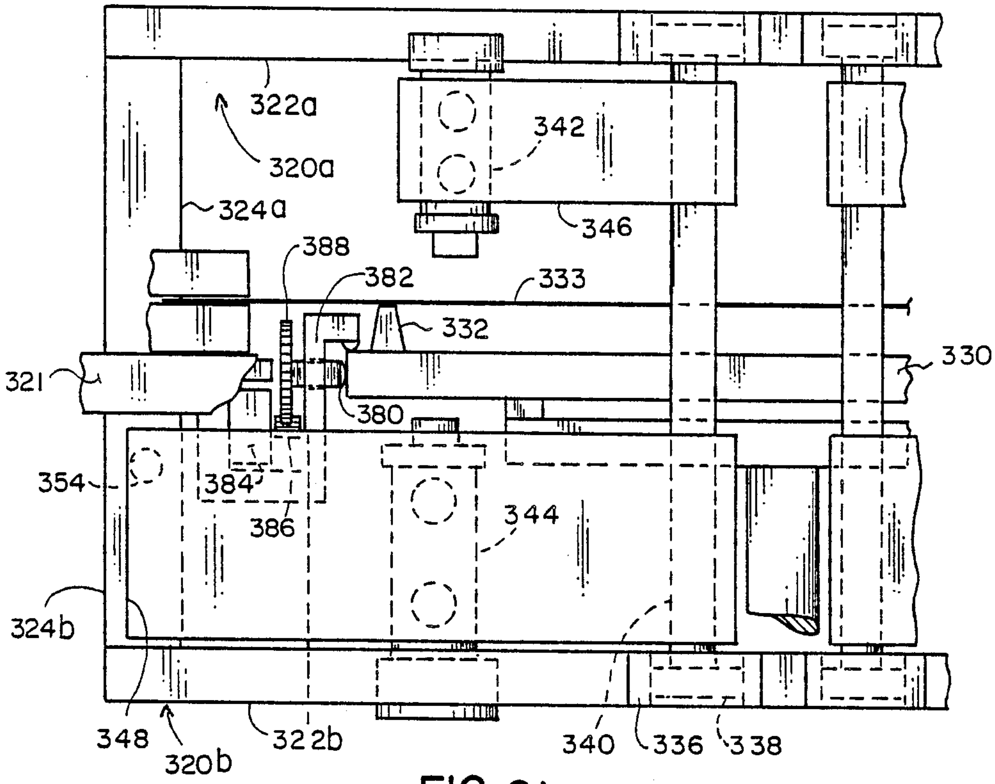
Figure 21B:
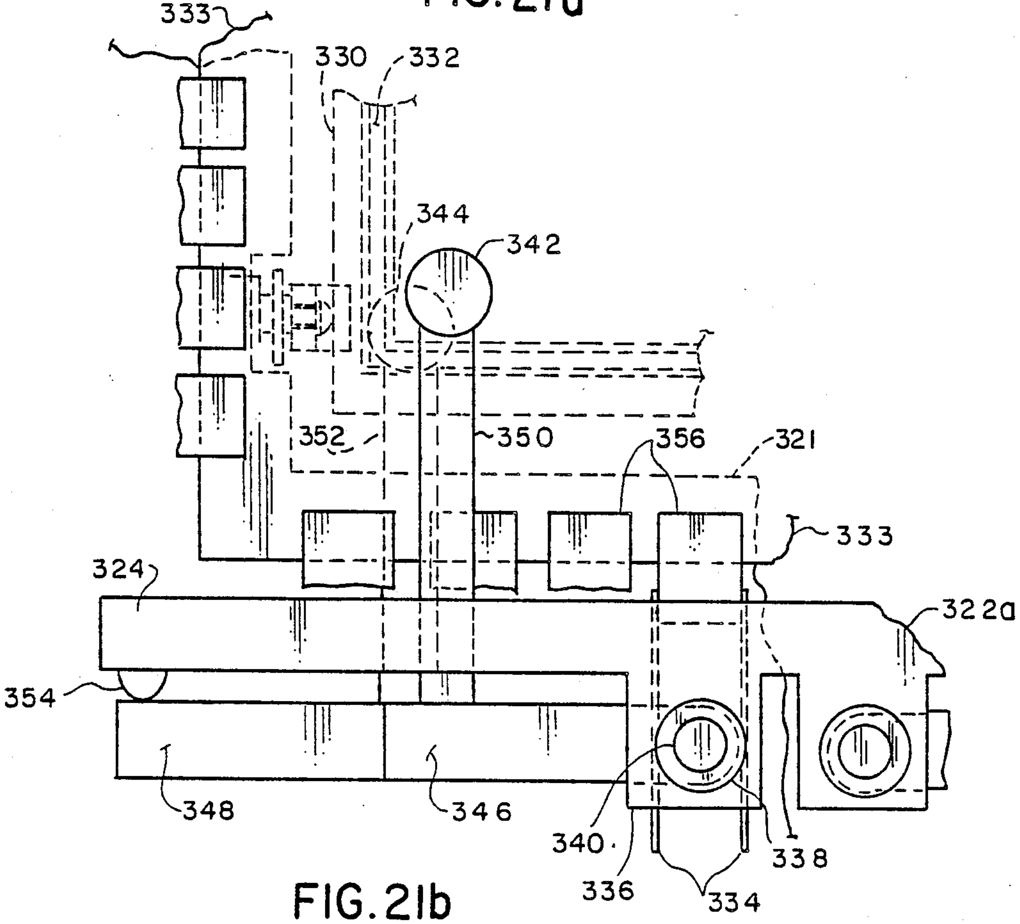
Figure 23A:
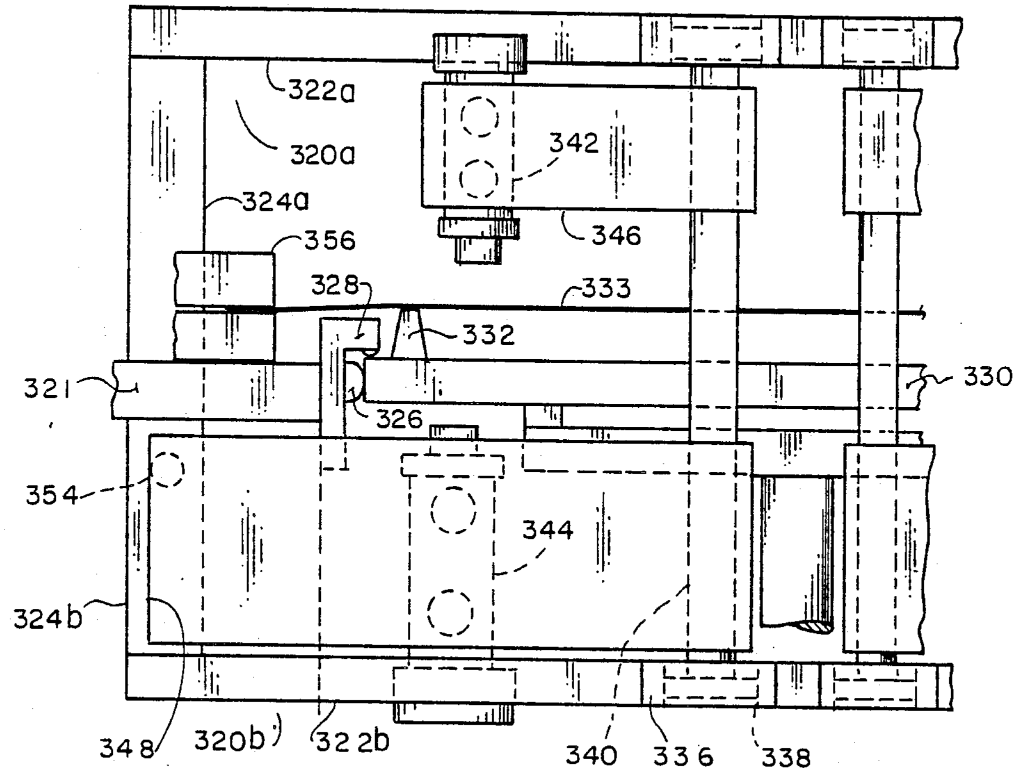
Figure 23B:
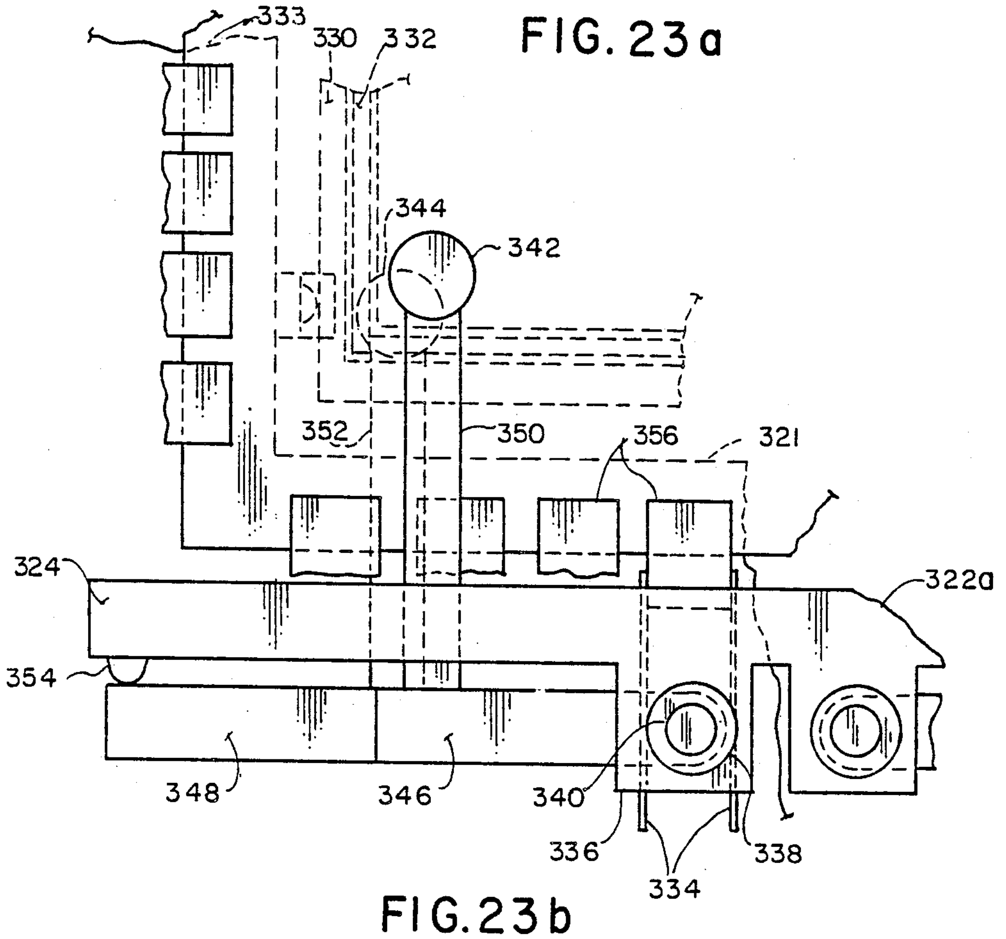

FIGS. **8*a*–8*c* depict modifications of the FIG. 5** fixture, in which:

FIG. **8*a*** depicts an apparatus providing a reduced number of independently variable applied forces;

FIG. **8*b* depicts a variant of the FIG. 8*a* embodiment which has provision for the application of tangential forces to the edge of a mask; and FIG. 8*c*** is a diagrammatic view of means for the application of the tangential forces;

FIGS. 9 and 10 indicate the principles of operation of a quadrant detector optical sensing system used with the fixture of FIG. 5; the sequence of determining the location of sensing holes in a mask under tension relative to reference points independent of the mask is indicated;

FIG. 11 is a curve that indicates the output voltage from a matrixing circuit forming part of the quadrant detector optical sensor system;

FIG. 12 is a plan view representing schematically a system employing the principles of the invention, including multiple feedback loops;

FIGS. **13*a*–13*f* depict details of components and operation of a mask mounting fixture based on the system shown by FIG. 12, and include FIGS. 13*a*, 13*c*, 13*d*, 13*e*, and 13*f*, which are views in elevation depicting details of the components during the sequence of operation; and FIG. 13*b*,** which is a plan view of the fixture;

FIGS. **14*a* and 14*b* consist of two plan views of a cathode ray tube screen showing two undesired screen conditions, FIG. 14*a*, is a simplified plan view illustrating a screen pattern position as translated and/or rotated with respect to its nominal position; and, FIG. 14*b*** illustrates a condition in which the screen pattern geometry is distorted, i.e., the size and/or shape of the pattern is distorted;

FIG. 15 is a perspective view of a panel holding fixture which makes possible adjustment of the position of the contained panel;

FIG. 16 is a view in elevation of a representative section of a screen inspection designed to receive the adjustable fixture depicted in FIG. 15, and of a feedback loop for adjusting that fixture;

FIG. 17 is a more detailed view in elevation of a representative section of the same screen inspection machine;

FIGS. **18*a*–18*c*** depict a grille aperture pattern as seen by a video camera and resulting pulse outputs:

FIG. **18*a*** is a plan view, greatly enlarged, of one corner of a grille;

FIG. **18*b* is a waveform indicating the horizontal output signal from a specific scan line; and FIG. 18*c*** is a waveform indicating a vertical output signal;

FIG. 19 is a view in elevation of a representative section of a screen inspection machine designed specifically to accept a faceplate;

FIG. 20 is a detail view in elevation of a modified form of the assembly machine depicted in FIG. 13;

FIGS. **21*a* and 21*b* are partial views of an assembly machine providing for screen inspection and adjustment. FIG. 21*a* is a view in elevation of representative section of the machine; FIG. 21*b*** is a view from the top of the machine;

FIG. 22 is a schematic diagram of a difference-forming circuit for controlling servo motors;

FIGS. **23*a* and 23*b* depict a simplified version of the assembly machine of FIG. 21. FIG. 23*a* is a view in elevation of a representative section of the machine, FIG. 23*b*** is a view from the top of the machine;

FIGS. **24*a* -24*c* depict diagrammatically means for developing error signals which indicate directly the position differences between a shadow mask and a grille, and include FIGS. 24*a* and 24*b*, which are views in elevation indicating the illumination of two specific apertures, and FIG. 24*c*, which is a greatly magnified plan view of the illuminated apertures; and FIG. 25** is an additional view of an assembly machine in which servo motors are mounted on a movable carrier.

DESCRIPTION OF THE PREFERRED EMBODIMENTS

Apparatus according to the invention is for use in the manufacture of a color cathode ray tube having a shadow mask with a central pattern of apertures mounted in tension on a transparent flat front panel. The mask aperture pattern is in registration with a corresponding cathodoluminescent screen pattern on an inner surface of the panel. The front panel has mask support means secured to the screen-bearing inner surface of the panel along opposed edges of the screen pattern. The shadow masks and front panels are respectively interchangeable according to the invention.

FIGS. 1–13 illustrate apparatus and method according to the parent copending application S/N 223,475 in which interregistry of a screen pattern with a tension mask aperture pattern is achieved by stretching or otherwise expanding the mask to a predetermined standard. The remaining figures illustrate method and apparatus invention wherein errors in position (x-y rotation) and geometry (size and shape) of the screen are determined and compensated for.

Figure 1:
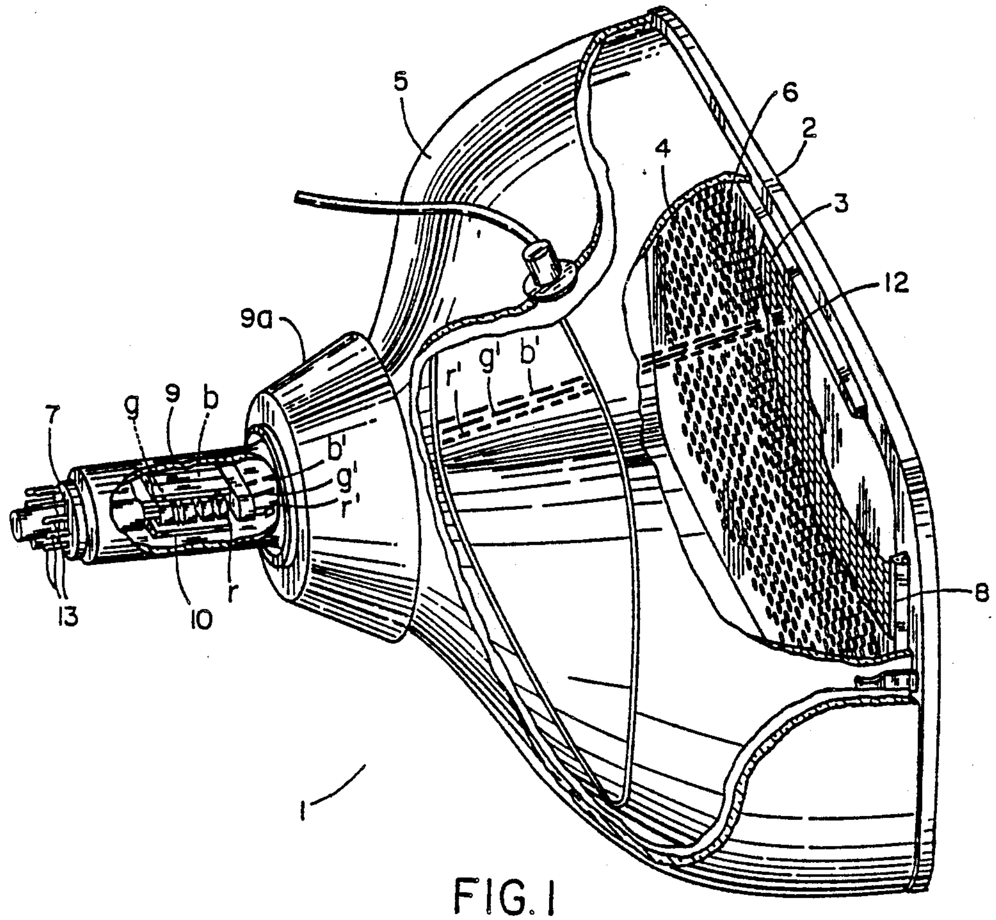
FIG. 1 is a view in perspective and partially cut away depicting a flat tension mask color cathode ray tube of the type with which this invention may be employed.

FIG. 1 depicts a flat tension mask color cathode ray tube 1 including a glass front panel 2 hermetically sealed to an evacuated envelope 5 extending to a neck 9 and terminating in a connection plug 7 having a plurality of stem pins 13.

Internal parts include a mask support structure 3 permanently attached to the inner surface 8 of the panel 2 which supports a tension shadow mask 4. The mask support structure 3 is machine ground to provide a planar surface at fixed "Q" distance from the plane of the inner surface 8. On the inner surface 8 of the panel 2 is deposited a screen 12 comprising a black grille, and a pattern of colored-light-emitting phosphors distributed across the expanse of the inner surface 8 within the inner boundaries of the support structure 3. The phosphors 12, when excited by the impingement of an electron beam, emit red, green and blue colored light.

The shadow mask 4 has a large number of beam-passing apertures 6, and is permanently affixed as by laser welding to the ground surface of the support structure 3.

In the neck 9 of tube 1 there is installed a cluster 10 of three electron guns identified as r, g and b. The electron guns emit three separate electron beams designated as r', g' and b' directed toward the mask 4. The electron beams are electronically modulated in accordance with color picture signal information. When deflected by magnetic fields produced by a yoke 9*a* external to the tube, the electron beams r', g', and b' are caused to scan horizontally and vertically such that the entire surface of the mask 4 is swept in a periodic fashion to form an image extending over substantially the entire area of the screen 12 within the inner boundaries of the mask support structure 3.

At positions on the mask 4 where there is an aperture 6, each of the three electron beam passes through the mask and impinges on the screen 12. Thus, the position of the mask 4 with its pattern of apertures 6, the positions of the electron guns r, g and b at 10, and the height of the support structure 3 control the locations where the electron beams r', g' and b' impinge on the screen 12.

For proper operation of the tube 1, there must be on the screen 12, a light emitting phosphor deposit of the proper color characteristic corresponding to the color information of the impinging electron beam r', g' or b'. Further, for proper operation, the center of the area of impingement of the electron beam must coincide within a narrow tolerance with the center of the associated phosphor deposit.

When these conditions are met over the entire surface of the screen, then mask and screen are said to be registered.

The rectangular area within which images are displayed, i.e., the area covered by the electron beams on the screen, is larger than the corresponding area on the mask through which those electron beams pass; the linear magnification from mask to screen is of the order of a few percent. Detailed studies have shown that this magnification varies slightly across the screen. Therefore, when a phrase such as "registration between mask and screen patterns" or "registration between the aperture pattern of the mask and the screen pattern" is used in this specification, it does not mean that the two patterns are congruent like a photographic negative and its contact print. Rather, it means that the two patterns are related to each other as required in a color tube of the flat construction described, using a support structure of predetermined height and having a predetermined spacing from mask to screen. Such registration of mask and screen is with respect to the electron beam center of deflection. As noted, in color tubes of conventional construction, registration is facilitated by using pairing dedicated shadow masks and front panels.

Conventional shadow masks are produced by photoetching the apertures in a flat metal sheet, then deforming the flat sheet into a bowl shape. After this deformation process, the formed masks are not interchangeable. However, with a mask that remains flat, the original interchangeability of flat sheets photoetched from a common master is retained. This is an important factor in the method and apparatus hereinafter described.

In a flat tension mask tube, the tension mask is typically made of steel foil about 0.001 inch thick. The mask is under substantial mechanical tension; the stress may be between 30,000 and 50,000 pounds per square inch. The mask is therefore stretched to a significant degree, the elastic deformation exceeding one part in one thousand; e.g., the conventional flat tension mask manufacturing method puts each mask into an elastically deformed condition before producing, by photolithography, the screen which will be used with that mask.

The present invention, on the other hand, calls for all screens to be made from a common master so that they are interchangeable. It also recognizes that the unstretched masks, as mentioned earlier, are very nearly alike, and it takes advantage of the elastic deformation of a mask that occurs when a mask is stretched. By applying controlled forces to a plurality of clamps gripping peripheral portions of the mask, each mask may be stretched in such a manner that its size and shape conform to a predetermined standard. If desired, the required forces may be substantially reduced by heating the mask during the stretching process.

The same clamps and forces also permit centering of the mask by moving it along its x and y axes (the major and minor dimensions in the plane of the mask), and by rotating it if need be, until multiple reference marks on the mask are aligned with corresponding fixed markers to indicate that position, size and shape of the mask now conform to a predetermined standard. Once this is achieved, a panel carrying a standardized screen and the mask are registered, in a manner to be described, with the mask contacting the mask support structure. The mask is then affixed to the mask support structure, as by laser welding.

Figure 2:
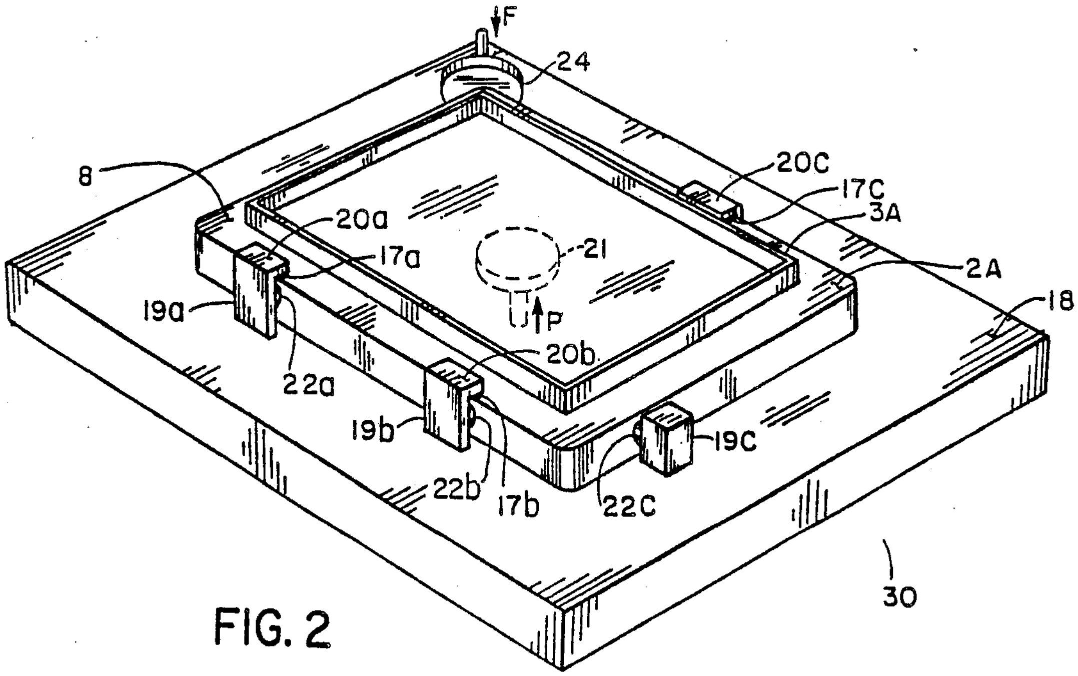
FIG. 2 is a perspective view of a universal holding fixture useful in the practice of the present invention.

FIG. 2 depicts a six-point universal holding fixture 30 for glass front panel assemblies to be used during all manufacturing processes requiring reproducible positioning of a panel 2*a* in reference to an established set of datum coordinates. Panel 2*a*, carrying mask support structure 3*a*, is shown on a fixture plate 18, using a holding method comprising three half-ball locators 22*a*, 22*b*, and 22*c*, attached to posts designated as 19*a*, 19*b* and 19*c*, to control lateral position, while three vertical stops 20*a*, 20*b* and 20*c* control vertical position. Vertical stops 20*a*, 20*b* and 20*c* are provided with firm but relatively soft contact surfaces 17*a*, 17*b*, and 17*c* made of a material such as Delrin (TM) to protect the inner surface of panel 2*a*. A pressure device 21, shown in phantom lines below panel 2*a*, exerts an upward vertical force P to assure firm contact between the inner surface and the three vertical stops 20*a*, 20*b*, and 20*c*. A second pressure device 24, exerting a horizontal force F in the direction toward the corner between posts 19*b* and 19*c*, assures firm contact between the panel *2a* and the three half-balls, 22*a*, 22*b*, and 22*c*.

Figure 3:
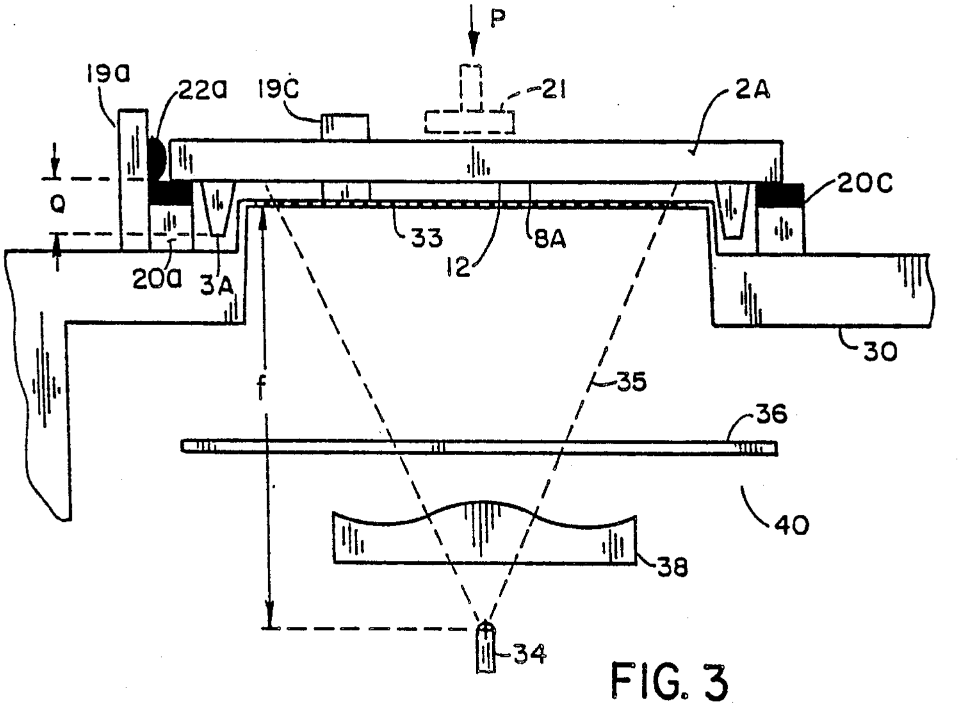
FIG. 3 is a schematic view in elevation of a modified version of the universal holding fixture depicted in FIG. 2, adapted for use with a lighthouse.

Vertical stops 20*a* and 20*b* are co-located with posts 19*a* and 19*b*, but the third vertical stop 20*c* is completely separated from post 19*c*. By controlling within close limits the position of the three half-ball locators 22*a*, 22*b*, and 22*c*, as well as the plane defined by the three vertical stops 20*a*, 20*b*, 20*c* in different work stations in the manufacturing process, the position of a given panel in each of such work stations may be accurately duplicated. FIG. 3 illustrates a modification of the universal holding fixture 30 adapted to a lighthouse 40. It will be noted that the panel 2A and the vertical stops, two of which are depicted (20*a* and 20*c*), have been inverted, while the posts, two of which are depicted (19*a* and 19*c*), remain upright to allow insertion of panel 2A from above. Pressure device 21 is optional in this modification, since the weight of panel 2A may suffice to ensure proper seating on the vertical stops.

As is well known in the art of manufacturing color cathode ray tubes, a lighthouse is used for photoexposing light-sensitive materials applied to the inner surface 8A of panel 2A. Four separate exposures in four different lighthouses are needed to produce the black background pattern and the three separate colored light emitting phosphor patterns which comprise the screen 12. Photoexposure master 33 is permanently installed in lighthouse 40, with the image-carrying layer facing upward and spaced a very small distance (0.010", e.g.) from the inner surface of the panel 2A. At a fixed distance "f" from the plane of the photoexposure master 33 is placed an ultraviolet light source 34 which emits light rays 35 which simulate the electron beam paths in a completed tube.

A shader plate 36 modifies the light intensity over the surface of the mask so as to compensate for the variation of distance from the light source and for the variation of angle of incidence, thereby achieving the desired exposure in all regions. Lens 38 provides for correction of the paths of the light rays so as to simulate more perfectly the trajectories of the electron beams during tube operation.

Experience has indicated that screen patterns produced by following the procedures just described are sufficiently accurate for use in high resolution tubes, provided that the Q height of support structure 3A, measured from the inner surface 8A of panel 2A to the machine ground top surface of the support structure, is held to a very close tolerance.

Figure 4:
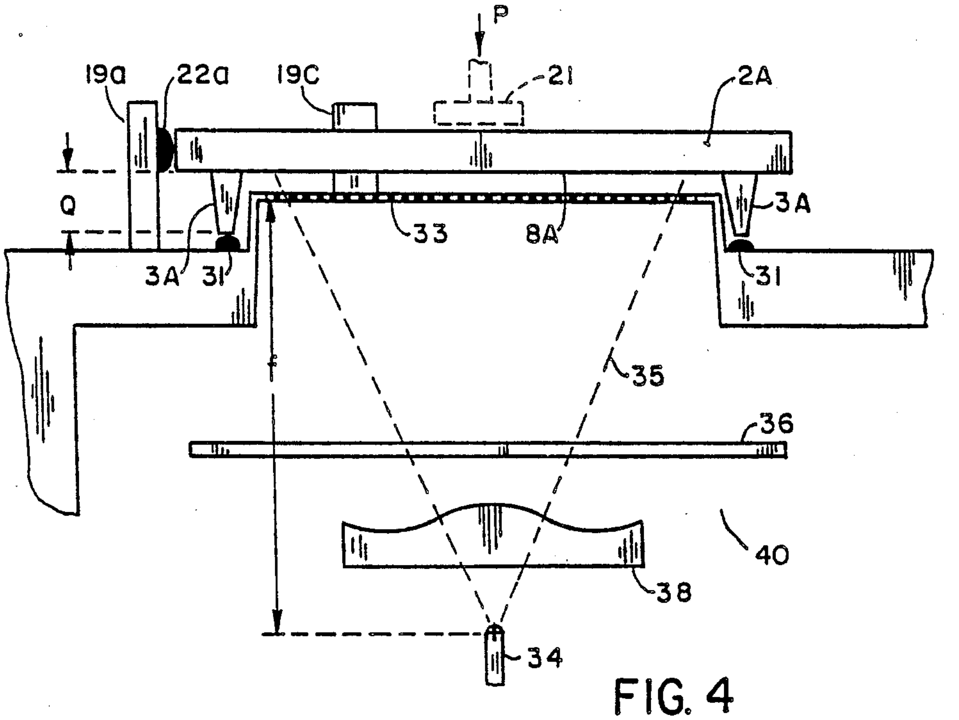
FIG. 4 is a view similar to FIG. 3 of the fixture depicted FIG. 3 which represents a modification of the fixture to accommodate a wider tolerance in the Q-height of the mask support structure.

A modification of FIG. 3, depicted in FIG. 4 accommodates a wider tolerance in the Q height of the mask support structure. Here the vertical stops are replaced by half-balls 31, and the panel 2A rest, not on its inner surface, but on the ground top surface of support structure 3A. If, for example, that structure on a given panel is 0.002" too high, that panel in consequence sits that much higher during exposure, and the light pattern recorded on it is larger than normal. This is exactly what is required; when a mask is eventually affixed to this support structure, it will be 0.002" farther away from the panel, causing the electron beams also to form a larger pattern, and thus compensate for the excess vertical height Q. In effect, then, an interchangeable screen is produced in spite of the 0.002" error in support structure height Q.

The process for producing the screen pattern described in connection with FIGS. 3 and 4 differs from the conventional process in that for each of the four photo exposures, a permanent master is used rather than an individual mask uniquely associated with a particular screen. However, because this invention makes it unnecessary to match each screen to a particular mask, other more economical processes may be used to manufacture the screen pattern. Well-known printing processes such as, for example, offset printing, are particularly well adapted to producing the required precise screen pattern on flat glass plates. The important aspect of using offset printing is that four separate processes of photo-exposure, development and drying, followed by coating for the next process, are no longer required. In effect, offset printing offers the possibility of inexpensively producing an interchangeable screen pattern as required by this invention.

FIG. 5 depicts schematically a machine 50 for applying controlled forces to a plurality of clamps gripping peripheral portions of the mask, capable of moving and elastically deforming the mask until its position, size and shape conform to a predetermined standard. The machine is also equipped to move a screened panel into a specified position adjacent to the mask and to weld the mask to the support structure; these features, not shown in FIG. 5, will be described in detail later.

If offset printing or a similar process is employed, the height Q of support structure 3A must be controlled to an accuracy appropriate to the special requirements of the application.

FIG. 5 depicts a rectangular in-process shadow mask 4A having a wide peripheral portion. This is the form in which the mask emerges from the photoetching process. The central apertured region of the mask is bounded by rectangle 43. Outside this rectangle and surrounding it there is a row of widely spaced position-sensing apertures 47. Optical markers attached to machine 50, to be described in detail later, serve as position references and present in this embodiment the afore-discussed predetermined standard. It is the task of machine 50 to apply a distribution of forces to the mask such as to bring all apertures 47 into coincidence with their corresponding optical markers.

Located around the periphery of mask 4A is an array of clamps 44 which may each comprise a pair of actuatable jaws. For purposes of illustration, twenty-eight clamps are depicted. The reason for having a plurality of clamps on each side is that the individual clamps must be free to move apart as needed when the mask is stretched. The same plurality also permits application of a desired distribution of forces about the periphery of the mask 4A.

It must be kept in mind that the apertured central region of the mask inside rectangle 43 has an average elastic stiffness considerably smaller than that of the solid peripheral portion. Since it is desirable in the stretching process to essentially maintain the rectangular configuration of the central apertured region, stretching forces must be graded, with the magnitude of each force related to the local elastic stiffness encountered at each clamp 44. For example, the opposing clamps 101 and 115 act on solid material at one end of the mask; they therefore require considerably greater force than opposing clamps 104 and 118 which act on a portion containing largely apertured material.

FIG. 6 depicts a curve 51 representing the distribution of required force along one edge of mask 4A. It is seen that the force required near the corners is about 70% higher than that near the center.

In principle, it would be possible to control the forces applied to a large number of clamps, say twenty-eight as in FIG. 5, individually. But in practice, mass-produced masks are very much alike and there is no need for such a large number of independently variable forces. In fact, if the photoetched masks were exactly alike in thickness, elastic properties and detailed geometry, the forces to be applied to them to obtain a standard shape would always be the same. Such forces could be preprogrammed, and no feedback would be required.

In practice there are unavoidable variations in thickness between masks as a whole, as well as across each mask, and there may be slight variations in geometry caused, for example, by temperature variations during manufacture. To compensate for these variations, some force adjustments are necessary, and these are controlled by feedback according to this invention.

It is evident that the number of independent adjustments required in a specific case depends on the accuracy with which the masks are manufactured and on the tolerance required for the particular tube design. In an extreme case where tolerances are fairly wide, thickness variation between different lots of masks may be the only significant variation. In this case only two independent adjustments, namely the total forces applied in the x and y directions, need to be controlled by feedback. The distribution 51 of applied forces within each coordinate axis may then be achieved by purely mechanical means such as, for example, a system of levers.

FIG. 7 illustrates the use of levers to distribute forces according to predetermined ratios. The figure shows six clamps labeled 109–114, assumed to be attached to one of the short edges of the mask. The desired forces, in arbitrary units, are, in this example: 1.7, 1.3, 1, 1, 1.3, 1.7. Forces along the pull rods are underlined in the figure; the figures associated with the levers indicate lever ratios. It is seen that any desired ratio of forces for any desired number of clamps along one edge can be so generated.

FIG. 8*a* illustrates a modification of FIG. 5, where there are still 28 clamps but only eight position-sensing apertures 47, and a total of twelve independently variable forces. Adjacent clamps are interconnected by levers as just explained, with the result that there are just three independent forces along each side. The four position-sensing apertures located in the corners are designed to detect position errors along both the x and y axes; those four apertures positioned near the center of each side respond only to radial, i.e., inward or outward displacements. Thus the total number of position error signals is twelve, equal to the number of independently controllable forces.

The addition to applying forces which act at right angles to the edges of the mask, it may sometimes be desirable to apply tangential forces in a direction parallel to an edge. FIG. 8*b* illustrates such an arrangement, using as an example a tension mask in which apertures 406 within boundary 443 are parallel slots rather than round holes. Slot masks are commonly used in color cathode ray tubes intended for television receivers. The slots conventionally run along the vertical (y) direction; they are not continuous from top to bottom, but are bridged at regular intervals by tie-bars to increase the mechanical stability of the mask.

In a color cathode ray tube of the flat tension mask type, a similar pattern of apertures, i.e., slots parallel to the y-axis and bridged at regular intervals, may be used. Only the x-coordinate of the mask pattern need register with the screen pattern, assuming that the phosphor stripes are continuous. Parallel to the slots, along the y-axis, high mechanical tension is applied; the amount of this tension is not critical so long as the elastic limit of the mask material is not exceeded. Along the x-axis, a carefully controlled amount of tension is applied; because the mechanical stiffness of the delicate bridges (not shown) is rather small, the tension in this direction must also be low.

Machine 450 in FIG. 8*b* is designed to apply controlled forces, including tangential forces, to a slot mask 404. Along the two vertical edges, clamps 444 are pulled outwardly by forces acting at right angles to those edges. The four clamps located near the middle of each edge are interconnected by levers. Six independently controllable forces $F_1$ through $F_6$ are applied to these two edges.

Turning now to the two horizontal edges, predetermined forces $F_0$ which need not be controlled by feedback are applied at right angles to these edges near the four corners of the mask. However, the two middle clamps on each horizontal edge are pulled generally outward by forces $F_R$(1), $F_R$(2) which are not perpendicular to the edge but have a controllable tangential component.

FIG. 8*c* shows how such a force may be generated. Two stepping motors 424*a* and 424*b* are mounted on the frame 432 of machine 450 under angles of plus and minus 45 degrees as indicated. The motors carry reduction gears 428*a*, 428*b* terminating in pull rods 431*a* and 431*b*, respectively. A third pull rod 430, linked to the first two pull rods by springs 425*a*, 425*b*, connects to the lever which drives the two middle clamps. Clamps 460 along the horizontal edges are constructed somewhat differently from clamps 444. They are pivoted as shown so as to permit the application of tangential force components without producing local moments at the edge of the mask.

In operation, the two motors are caused to advance their respective pull rods 431*a*, 431*b* until a predetermined force $F_0$' is generated on pull rod 430. This force acts at right angles to the edge, and its exact value is not critical.

Assume now that to compensate for a variation in mask thickness, the center portion of the mask needs to be pulled to the right as illustrated by $F_R$(1) as shown in FIG. 8*b*. To this end, stepping motor 424*a* is advanced so that its pull rod 431*a* is pulled closer to the frame. At the same time, motor 424*b* is backed up so that pull rod 431*b* is extended beyond its normal position. As a consequence, the lower end of pull rod 430 moves to the right, and tangential force component $F_T$(1) is generated. This together with the perpendicular component $F_0$' produces the desired resultant force $F_R$(1). Eight position sensors (not depicted) using position-sensing apertures 447 are designed to respond solely to positioning errors in x. There are also eight independently controllable forces: $F_1$ through $F_6$, and the two tangential components $F_T$(1) and $F_T$(2), of which only the first is shown in FIG. 8*c*.

The technique described for applying tangential force components to a mask edge is by no means limited to the execution shown in FIG. 8*b*. A more comprehensive application of the principles described would have provision for applying tangential forces to all clamps. Further, the technique could be applied to masks of other types such as "dot" masks (masks with round apertures). The technique could be applied to clamps in a nonlevered clamping arrangement, as depicted in FIG. 5.

FIG. 9 illustrates the principle of operation of a commercially available quadrant detector optical sensor 89 which may be used in machine 450 to generate the needed positioning error signals. Such a sensor is sold by United Detector Technology of California and consists of a semiconductor chip having a photosensitive region in the shape of a circular disc which is divided into four 90-degree sectors. The photocurrent from each sector is separately available externally.

In FIG. 9, mask 4A is assumed to be in the correct state of tension with the position sensing apertures 47 in registration with optical detection light sensors 89. Each aperture 47 is fully illuminated by a light source 87 emitting a light beam 88. Light beam 88 may be produced by a laser or by a more conventional optical source.

A plurality of quadrant detector light sensors 89 is mounted on a plate 91 whose position with reference to the frame of machine 450 is precisely defined, as described in detail later in connection with FIG. 13. The active area 92 of the quadrant detector light sensor is in vertical alignment with the desired position of position sensing aperture 47. The illuminated area 47*a* represents the image of aperture hole 47 projected on active surface 92 of quadrant detector light sensor 89.

The diameter of light beam 88 is larger than the diameter of the active area 92 of quadrant detector light sensor 89, while the diameter of position-sensing aperture 47 is substantially smaller. If a position-sensing aperture is in exact concentric alignment with the active area 92 of its quadrant detector light sensor 89, all four sectors produce the same photocurrent; a matrixing circuit well known in the art, designed to indicate any unbalance between the sector currents, will then indicate zero position error in both x and y coordinates. More specifically, the matrixing circuit provides two outputs. The first indicates the difference between the sum of the two left sector currents, and the sum of the two right sector currents; this indicates an error in the x coordinate. The second output indicates the difference between the sum of the two upper sector currents and the sum of the two lower sector currents, thereby signaling an error in the y coordinate.

FIG. 10 illustrates a condition where a position-sensing aperture 47 is not aligned with the active area 92 of quadrant detector sensor 89; therefore, the projected image 47*a* is not aligned, the four sectors are unequally illuminated, and a nonzero output signal is generated. In the specific case, the sum of the left sector currents is larger than that of the right sector currents, producing an output in the x coordinate indicating that aperture 47 is too far to the left.

FIG. 11 indicates the output voltage V from a matrixing circuit of the type described, plotted against the displacement delta x of the aperture. The steep center portion a corresponds to displacements smaller than the radius of position sensing aperture 47. For larger displacements, the output becomes constant (shown at b). Further displacement causes the image of position sensing aperture 47 to cross the edge of active area 92; the output, shown at c, decreases and reaches zero (d) as the image of aperture 47 leaves the active area. The distance between point d and the center of the plot indicates the maximum positioning error which this particular sensor and position-sensing aperture combination can read.

Optical detection is by no means the only way of determining position errors. For example, very precise position measurements can be made using a combination of air nozzles, mask apertures, and flow or pressure gages.

The position-error signals are utilized, as previously explained, to correct any errors in mask position and orientation, to stretch the mask, and to adjust its shape. Some of these operations may require certain clamps 44 to back up, i.e. to provide slack so that other clamps can move outward without increasing mask tension. However, the force exerted by each clamp always remains directed outward; backup is achieved by reducing the force exerted by one clamp momentarily below the force of the opposing clamp or clamps.

The required pulling forces may be produced by hydraulic, pneumatic or electric drives. For example as depicted herein, electric stepping motors, geared down so as to produce large force with small displacement, are well adapted to be driven by computer controlled pulses. If one desires to produce an adjustable force rather than a controlled displacement, a spring may be inserted between motor and clamp.

It should be remembered that in practice, one motor may drive a plurality of clamps through a force distributor such as the one depicted in FIG. 7.

According to the invention, computer means are provided for adjusting the force produced by each motor or other force generator. If there were only one motor and one error-sensing means, the feedback loop would be a simple servo and no computation would be needed. The same would be true if each motor influenced only the positioning error of one coordinate in one particular sensor location; a separate loop would then be required for each motor-sensor pair, but there would be no interaction between pairs.

In practice, the situation is more complex; each motor causes displacements at most or all sensor locations. These displacements are largest close to the clamp driven by the particular motor, and much smaller elsewhere, but if there are several or many independent motors, these contributions add up. Each such contribution can be characterized by a matrix coefficient, and for a given configuration of motors, clamps and sensor locations, these coefficients can be determined once and for all, and stored in computer memory. The problem of determining the values of the N forces required to reduce N position errors to zero is then merely that of solving N simultaneous linear equations, a task easily and rapidly performed by a computer.

The clamps used to transmit the controlled forces to the periphery of the mask must be capable of withstanding a pulling force of the order of 30 pounds per inch of width, with a sufficient safety margin. Uncoated steel jaws may be used, in which case clamping forces of several hundred pounds are needed for clamps about one inch wide; elastomeric coatings greatly reduce this requirement but may introduce an element of wear. Hydraulic drives are well adapted to produce the large static force required upon closure. The jaws are preferably held open by relatively weak springs when hydraulic pressure is not applied. During normal operation of machine 450, jaw pressure is applied or released in all clamps at the same time, so that only a single valve is required to apply or remove hydraulic pressure.

FIG. 12 is a schematic representation of the multiple feedback loops above described. Position error signals from position-sensing apertures 47 and quadrant detector light sensors 89 are analog signals; they are converted to digital signals in analog/digital converter 121 and are then sent to computer 122. The computer, having the appropriate matrix coefficients stored in its memory 123, calculates the forces to be generated by stepping motors 124 and, based on the known constants of springs 125 and of the force distribution system 126 which transmits the force generated by each motor to several clamps 44, computes the number of steps by which each motor should be advanced or retarded. It also generates the appropriate number and type (forward or backward) of pulses. These pulses are amplified in power amplifiers 127 and applied to the motors 124 which are equipped with reduction gears 128.

The computer also controls the opening and closing of hydraulic valve 129 which applies hydraulic pressure to clamps 44, forcing the jaws to close when the mask is to be clamped and allowing them to open when the mask is to be released.

The arrangement described in connection with FIG. 12 lends itself to the process of bringing the mask into registration with a predetermined standard pattern. FIGS. 13*a*–13*f* illustrate an environment in which this arrangement is used to manufacture mask-panel assemblies for flat tension mask color cathode ray tubes. It is to be understood that the machine 130 depicted in FIGS. 13*a*–13*f* comprises, or operates in connection with, the elements of FIG. 12.

The most important element of machine 130 is a rugged frame 131. One side of this frame is depicted in vertical section in FIG. 13*a*, and a view of the entire inside portion of the frame as seen from below is depicted in FIG. 13*b*. The top of the frame is a flat machined surface 132 on which clamps 44 can slide. The frame forms a window-like opening, somewhat smaller (for example, by one inch about both x and y) than the mask in its original, uncut form.

Four indexing stops 133*a*, 133*b*, 133*c* and 133*d* are shown as being attached to the inside of the frame. The stops 133*a* and 133*b*, placed symmetrically along a common edge, carry half balls 222*a*, 222*b*, as well as vertical stops 220*a*, 220*b*. The half-ball 222*c* is positioned around the corner from 222*b*, but the third vertical stop 220*c* , is in the center of the edge opposite the 133*a* and 133*b* stops.

These six indexing elements, together with means (not shown) for pushing a panel upward and sideways to maintain contact at all six points, constitute a form of the six-point universal holding fixture 30 previously described.

Figure 13C:
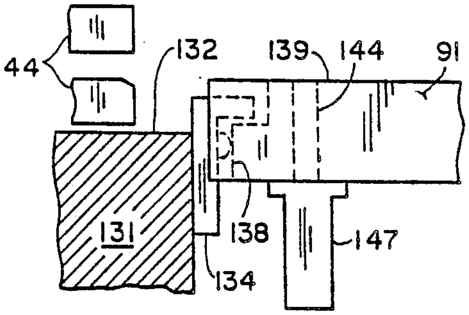
Figure 13D:
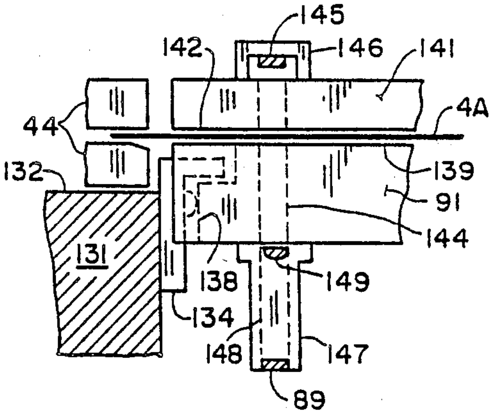

A bottom plate 91, seen in section in FIGS. 13*c* and 13*d*, can also be pushed against the same indexing elements. It is large enough to nearly fill the window in frame 131, leaving just a narrow slit all around. It has four cut-out portions 138 to accommodate the six indexing elements, so that bottom plate 91 can be precisely seated. When plate 91 is so seated, its flat top surface 139 is horizontal, parallel to the machined top surface 132 of the frame 131, and coplanar with the top surface of the lower jaws of clamps 44 which rest on surface 132.

There is also a top plate 141 with a flat horizontal bottom surface 142 which can be brought down from above to set itself against the top surface 139 of bottom plate 91. Both bottom and top plates are equipped with optical devices to be described later.

Instead of the top plate, the welding head 143 of a high-powered laser (see FIG. 13*f*) may be brought down to where its focal point lies in a plane just above the machined top surface 139 of bottom plate 91.

In the starting condition of machine 130 shown in FIG. 13*c*, bottom plate 91 is seated against the six indexing elements. Two retractable locating pins (not shown) protrude from top surface 139. Clamps 44 are retracted. A mask 4A is now placed on surface 139, with appropriate pre-etched apertures to fit the two locating pins.

Next, top plate 141 is lowered until it seats itself against mask 4A. The two protruding locating pins slip into clearance holes (not shown) in the top plate. Clamps 44 are advanced until they overlap the mask enough to allow clamping; they are then closed (FIG. 13*d*). Thereupon, the top plate is lifted by a small amount to free the mask, and the two locating pins are retracted.

Corresponding to every position-sensing aperture 47 in the mask (not shown in FIGS. 13*a*–13*f*), there is a cylindrical hole 144 in the top and bottom plates. Top plate 141 carries a lamp 145 in a small housing 146 over hole 144. Bottom plate 91, which remains in contact with the mask, carries an optical system 147 consisting of a quadrant detector light sensor 89 at the end of a tube 148, and a lens 149, which serves to focus an image of the mask position-sensing aperture 47 upon the quadrant detector light sensor 89. The optical system 147 attached to the bottom of the bottom plate 91 is designed to allow small lateral mechanical adjustments so as to set its position with great accuracy.

Returning now to the operating sequence of machine 130, the feedback system for positioning, stretching and shaping the mask is energized next. Preferably this is done gradually, so as to avoid undesirable mechanical transients. Once all positioning errors are within tolerance, the clamp positions are frozen; for example, if stepping motors are used to pull the clamps, these motors are electrically locked in position.

Figure 13E:
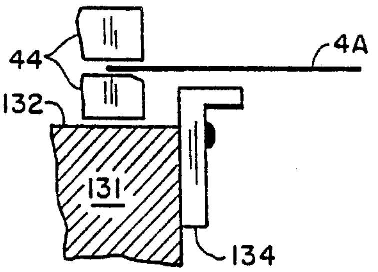
Figure 13F:
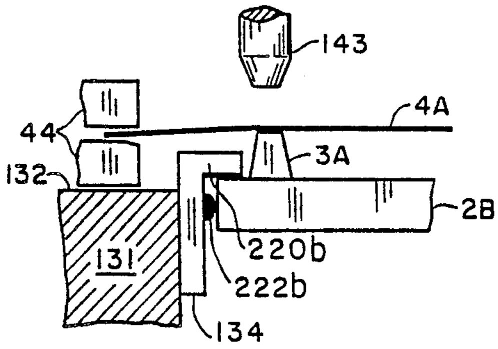

Top and bottom plates 141 and 91 are then both withdrawn and moved out of the way (see FIG. 13*e*). A screened panel 2B is inserted into the machine and lifted up against the mask 4A until it is seated against the six indexing elements. At this point, the ground top surface of mask support structure 3A touches the underside of the stretched mask and, preferably, lifts it a few thousandths of an inch. Welding head 143 is now lowered (FIG. 13*f*) and the mask is welded to the support structure. While other ways are available, this may be done in accordance with copending application Ser. No. 058,095 filed June 4, 1987, now U.S. Pat. No. 4,828,526 assigned to the assignee of this invention.

Next, the peripheral portion of the mask is cut off, preferably using the same laser, and the welding head 143 is lifted and moved out of the way. The clamps 44 are opened and retracted, leaving the cut-off peripheral portion of the mask to be discarded. Finally the completed assembly of panel 2B, and mask 4A—the latter now welded to mask support structure 3A—is lowered and removed from the machine. The two locating pins are once again extended, and the machine is ready for another cycle.

The process described in the preceding part of this specification is based on the assumption that when faceplate 2A is pressed against half-balls 22*a*, 22*b* and 22*c*, and the vertical stops 20*a*, 20*b* and 20*c*, the screen pattern is located precisely where it should be. But in practice, there are sometimes departures from the ideal situation. These departures fall into two categories:

(1) The entire screen pattern may be translated and/or rotated with respect to its nominal position, as indicated in FIG. 14*a*; note that there is no change in the geometry (i.e., size and shape) of the pattern;

(2) The screen pattern geometry may be distorted. The pattern may, for example, be stretched or narrowed in one or both dimensions, as indicated in FIG. 14*b*. Screen distortion may also occur in combination with pattern translation and/or rotation.

A certain measure of departure from the ideal must be expected in any production process. However, in this case, opportunities exist for eliminating or at least reducing the effect of such departures. These opportunities will now be reviewed.

ADJUSTING FACEPLATE POSITION TO CORRECT FOR TRANSLATION AND/OR ROTATION OF THE SCREEN PATTERN

If the screen is applied to the faceplate by offset printing or a similar process, it is probable that the predominant error will be a positioning error along one axis, i.e., x or y, caused by imperfect indexing of the translatory motion of the faceplate with the rotary motion of the printing cylinder. Other position errors resulting from a lateral displacement or slight rotation of the faceplate with respect to its nominal position in the printing press are also possible. On the other hand, there may be no significant distortion of the screen pattern geometry, so that repositioning the faceplate in the assembly machine would be all that is required.

Conceptually, the simplest approach is to follow the assembly procedure previously described in connection with FIGS. 13*a*–13*f* but to correct for any positioning errors of the screen pattern, i.e., translation or rotation with respect to its standard position, by adjusting the position of the panel before inserting it into assembly machine, or at least before the mask is welded to support structure 3A. Methods for doing so are described in the following.

One method employs a modified form of the universal holding fixture 30 previously described in connection with FIG. 2. The modified fixture 400 is shown in FIG. 15 and defines a receptacle for receiving a faceplate (front panel). The fixed half-balls 22*a*, 22*b* and 22*c* of FIG. 2 are replaced in fixture 400 by adjustable half-balls 401*a*, 401*b* and 401*c*. Each of these half-balls is shown as being mounted at the end of a micrometer screw 402 which may be rotated by an individual stepping motor 404 through worm gears 406. By selectively adjusting the positions of the three half-balls, a contained faceplate may be moved with respect to fixture plate 416 so as to bring the screen pattern into a predetermined position with reference to the fixture plate.

The procedure based on this approach is to load a faceplate into holding fixture 400, insert the loaded fixture into a screen-inspection machine (to be described in connection with FIG. 16), have that machine adjust the three half-ball settings so that the screen is correctly positioned, and then insert the loaded fixture into the assembly machine where the mask is positioned and stretched to conform to a standard pattern in position and geometry; the mask is then welded to the support structure. This assembly machine is essentially the same as the one depicted by FIGS. 13*a*–13*f*, except for such modifications as are required to accept and precisely locate fixture plate 416 instead of a faceplate.

To ensure stable and precise seating of each faceplate within fixture 400, the fixture comprises vertical stops 408*a*, 408*b* and 408*c*, and three leaf springs 410 to press the plate against the vertical stops. Leaf springs 410 may be rotated about pivots 412 to permit insertion of the faceplate 413 from below through rectangular opening 414 on the fixture plate 416. To ensure that the faceplate makes contact with all three half-balls, O-shaped leaf spring 418, mounted on post 420, presses against one corner.

In operation, a faceplate is loaded into fixture 400, locked in place by rotating leaf springs 410 to the position shown, and the fixture is inserted into screen inspection machine 430 depicted in FIG. 16. Grille position errors dx and dy are measured at a number of points. From the measured data, required adjustments of the three micrometer screws 402 are computed, and appropriate pulses transmitted to the three stepping motors 404. Inspection of any residual positioning errors remaining after this first adjustment may call for further adjustments; a feedback or servo loop exists here, permitting very precise adjustment of the faceplate position. This loop is indicated in FIG. 16, which shows schematically a screen inspection machine 430 designed to accept fixture 400 shown by FIG. 15, a computer 432 to convert position error signals 434 from sensor 431 (which may comprise a video camera) to stepping motor pulses 440, a connector 438 to connect the computer output to the three stepping motors 404, and micrometer screws 402 to adjust the position of the faceplate. As previously explained, the adjusted fixture is then mated to a mask in an assembly machine generally constructed as shown in FIGS. 13*a*–13*f* except that this machine is equipped to handle fixture plate 416 rather than the faceplate.

FIG. 17 shows one version of a screen-inspection machine in detail. This version can be used if, at the time of inspection, no aluminum film has been applied to the screen, or if the points to be measured, typically on the periphery of the viewing area, were masked off during application of the film, so that they remain unobscured. Faceplate 2B carrying grille 3 is locked in holding fixture 400 which in turn is inserted into inspection machine 430, lifted by table 362 and pressed upward against vertical stops 358 as well as laterally against half-balls 360, both mounted on brackets 359 (only one bracket is shown). Light sources 364 mounted on the lower face of table 362 illuminate small selected regions at the periphery of the grille through holes 366 in the table 362 and rectangular opening 414 in fixture plate 416. Video-camera-equipped microscopes 431, firmly attached to the frame 370 of machine 430, develop patterns corresponding to the grille configuration in the small selected region.

FIG. 18*a* shows, greatly magnified, the pattern representing one corner of the grille as seen by the video camera. In FIG. 18*a*, one horizontal scanning line 367 is marked; the corresponding output signal is shown in FIG. 18*b*. Other horizontal scanning lines will produce wider or narrower pulses, depending on where they cross the grille apertures. From the start and stop time of each pulse, the horizontal coordinates x of the hole centers can be calculated, and by using many scanning lines, readings can be averaged to reduce errors. Similarly, the vertical scan produces the sharp-edged pulses shown in FIG. 18*c*, thus providing information regarding the vertical coordinates y of the grille holes.

Computer 432 (FIG. 17) accepts this information, calculates the required adjustments of the three micrometer screws 402, and generates the appropriate pulses to stepping motors 404, as previously explained. This cycle may be repeated until residual errors are reduced below a predetermined tolerance level.

A different version of the screen inspection machine 430 shown by FIG. 17 must be used if the screen is fully aluminized at the time of inspection, so that even the peripheral portions of the grille are obscured. It then becomes necessary to inspect the grille from the outside, i.e., through the faceplate. For this purpose, fixture 400 shown by FIG. 15 may be inverted before insertion into machine 430; light sources 364, shown in FIG. 17, are replaced by light sources placed near video cameras 431. Video cameras 431 observe the grille through the full thickness of the faceplate 416. Faceplate thickness may vary, and the focus of the video cameras 431 must be adjusted to compensate for such variations. This may be done by a conventional automatic focusing system, or by a mechanism designed to sense the screen surface and arranged to respond to an increment S in faceplate thickness by retracting the cameras 431 by $S(n-1)/n$, where n is the refractive index of the faceplate glass.

Another method for correcting for screen pattern position errors avoids the use of a special holding fixture; the faceplate is directly inserted into the screen inspection machine depicted in FIG. 19. It will be noted that most of the important features of this machine 530, i.e. vertical stops 558 and half-balls 560, table 562, light source 564, hole 566, and video camera 531, have their counterparts in FIG. 17. The significant difference is the absence of holding fixture 400 and of the adjustable stops with their micrometer screws 402 and stepping motors 404. In addition, stops 558 and half-balls 560 are designed to accept the faceplate rather than the larger fixture plate 416.

Screen positioning errors are measured in machine 530 just as previously described in connection with machine 430 (FIG. 17), and micrometer adjustments required to correct for these errors are computed. However, in this case, no feedback loop exists; instead, the correction information is stored in the computer for later transfer to the assembly machine.

The assembly machine is a modified form of the machine shown by FIGS. 13*a*–13*f*. The modification consists in the fact that half-balls 222 have been made adjustable, as shown in the detail view, FIG. 20 (this figure should be compared with FIG. 13*f*). Half-balls 380 (only one is shown), are mounted on micrometer screws 382 which may be adjusted by stepping motor 384 through gears 386 and 388.

Before inserting a faceplate into the modified assembly machine indicated in FIGS. 13*a*–13*f*, modified in FIGS. 21*a* and 21*b*, the stored correction data for that faceplate are transmitted to stepping motors 384. Thus, when that faceplate is inserted into the assembly machine, the screen is in the correct position. A mask positioned and stretched to conform to a standard position and geometry is therefore joined to this faceplate without any further measurements, and registry of apertures and screen patterns result.

The use of a separate machine dedicated to screen inspection makes it possible to attach the position sensors—for example, video cameras 431 or 531—rigidly to frame 370 or 570 of that machine (see respective FIGS. 17 and 19), thus ensuring good reproducibility of the measurements. The faceplate or holding fixture can be inserted and removed without having to move the sensors out of the way.

It is, however, also possible to inspect the screen in an assembly machine. This alternative eliminates the need for a separate screen inspection machine and the associated extra handling of the faceplate, at the price of greater complexity and a slower working cycle for the assembly machine, brought about by the additional operations which must now be performed in that machine.

An example of such a machine is illustrated in FIG. 21*a*. This figure shows an assembly machine which comprises the basic features of the machine depicted FIGS. 13*a*–13*f*, modified to include adjustable the half-balls 380 as shown in FIG. 21 for adjusting the position of the faceplate, and further modified to include optical sensors for observing not only the mask but also the grille.

FIG. 21*a* depicts two similar gate-like structures 320*a* and 320*b* mounted above and below baseplate 321 (shown by FIG. 21*b*) of assembly machine 318, which, as noted, is generally analogous to the machine depicted in FIG. 13. Structures 320*a* and 320*b* consist of cross-bars 322*a* and 322*b* which are supported by columns 324*a* and 324*b* fastened to baseplate 321. A faceplate 330 with support structure 332 is shown inserted into the machine, and a mask 333 is under tension by virtue of the forces exerted by pull-rods 334 upon clamps 356.

Cross bars 322*a* and 322*b* are equipped with extensions 336 which carry precision bearings 338. A cylindrical shaft 340 is free to rotate within these bearings. Two optical devices 342 and 344 are firmly mounted on this shaft by means of bars 346 and 348 and outriggers 350 and 352. They can be swung out of the way for the purpose of mask and faceplate insertion, welding and removal, or they may be moved into the position illustrated, where bar 348 contacts half-ball 354 which is attached to one of the columns 324*b*.

Each of the optical devices 342 and 344 comprise a light source and an optical sensor. For example, device 342 may contain means for projecting a convergent hollow cone of light through the mask toward the aluminized inside surface of the screen so as to form a brightly illuminated spot on the inside of the mask after reflection by the film. The optical sensor in device 342 may be composed of a combination of focusing lens and quadrant detector similar to elements 149 and 89 of FIG. 13*d*, for the purpose of measuring position errors in x and y of a predetermined mask aperture, and for developing error signals related to such position errors.

Optical device 344, on the other hand, has the task of measuring position errors in x and y of the grille at a predetermined location. It is assumed here that the grille at this location is obscured by the aluminum film, hence backlighting may not be practical. Device 344, therefore, may contain means for illuminating a portion of the screen from the front, as well as a sensor, which may be a quadrant detector equipped with a focusing lens, but which preferably is a microscope with a video camera. As previously explained, the optical sensor in device 344 must be designed to compensate for variations in faceplate thickness, either by being equipped with an automatic focusing system, or by means of a mechanism designed to sense the screen surface.

The operation of assembly machine 318 is analogous to the procedure described previously in connection with the separate screen inspection machine (FIGS. 17 and 19): grille position information from the sensors of optical devices 344 (equivalent to sensor 431 in FIG. 16) is fed to a computer (equivalent to computer 432 in FIG. 16) which calculates the required corrections of the three half-balls (380 in FIG. 21*a*) and supplies appropriate pulses to stepping motors 384 so as to adjust micrometer screws 382 through gears 386 and 388. This is a closed feedback loop, analogous to the one shown in FIG. 16; repeating the cycle causes the error in screen position to be reduced below a predetermined tolerance level.

Quite independently of the adjustment of the faceplate position just described, mask 333 is monitored by the sensors of optical device 342 and stretched, as well as positioned, by clamps 356 driven by servo motors (not shown) through pull rods 334, in the manner previously explained, until the mask conforms to an established standard position and geometry. As soon as faceplate and mask adjustments have been completed, optical devices 342 and 344 are swung out of the way; the mask is then welded support structure 332, the excess material cut, and the assembly removed from the machine in the manner described in connection with FIGS. 13*a*–13*f*.

Adjusting Mask Position to Correct for Translation and/or Rotation of the Screen Pattern In the preceding part of this specification, methods were outlined for determining the departure of the grille (screen) from its nominal position, and for using this information to move the faceplate so that before the mask is welded to its support structure in the assembly machine, the grille is in its nominal position. There exists, however, an alternative way of using that same information. It is best illustrated by an example.

Let it be assumed that the screen is inspected in the machine shown in FIG. 19, and that the sensors find the grille displaced to the right by three mils, and upward by one mil, with 0.2 milliradians of clockwise rotational error. Following the procedures previously described, the micrometer screws in fixture 400 (FIG. 15), or in the assembly machine (FIGS. 20 or 21*a*–21*b*) would have been adjusted to move the faceplate three mils to the left and one mil down and rotate it counter-clockwise by 0.2 milliradians in order to bring the grille into its nominal position. But the same final result would have been obtained without making any mechanical adjustments to the faceplate, by moving the properly stretched mask three mils to the right and one mil up from its nominal position and rotate it clockwise by 0.2 milliradians. This can be done, for example, by first permitting the mask-stretching servo motors to position and stretch the mask to conform to the predetermined standard position and geometry, then disabling the servo loops and supplying appropriate input signals to the motors to displace the mask in an open-loop mode as required, without changing its size, shape or tension, i.e., while maintaining its geometry.

Another possibility lies in mounting all servo motors on a rigid carrier which is capable of being displaced as a whole, and applying the position correction to that carrier. This is illustrated in FIG. 25 which shows an assembly machine 600 including a frame 602, three half-balls 604 (only one of which is shown), and three vertical stops 606 (only two of which are shown) for locating faceplate 608, and a vertically movable table 609 for pressing the faceplate against the vertical stops. Frame 602 has plane top surfaces 610 which support frame-shaped carrier 612 through steel balls 614. Stepping motors 616 for stretching mask 618 through pull rods 620 and clamps 622 are all supported on the top surface of carrier 612.

The height of carrier 612 above the plane top surfaces 610 of frame 602 is precisely controlled by the steel balls. Its horizontal position may be adjusted by three micrometer screws 624 (only one is shown) which are controlled by stepping motors 626 through reduction gears 627 and 628. Only one stepping motor is shown, but three are required to uniquely define the horizontal position of the carrier; a compressed spring 630, shown schematically, ensures continuous contact between the tips of the three micrometer screws 624 and carrier 612.

To simplify the drawing, FIG. 25 shows no optical devices. Also, the horizontal dimension of the mask is shown reduced so that both sides of carrier 612 can be illustrated.

It is also possible to use the information from the screen inspection machine to bias the feedback loops which control the mask servo motors. This approach is illustrated in FIG. 22 for the case of analog signals. It is essential that both error signals are linear functions of the positioning errors, and that a given voltage corresponds to the same error for both sources (mask and grille). It will be obvious that a digital version of this circuit is also possible. In any case, the servo motors will move until the difference signal Xm−Xg, or Ym−Yg, is reduced to zero.

The three approaches just outlined have in common the principle that the mask is moved from its standard position to make up for a displacement of the grille. In all three cases, the mask is stretched to conform to a standard position and geometry and also displaced. In the first and second approach these two operations are carried out separately; in the third approach, they are merged. In all three cases, the instructions for the additional displacement come from a separate screen inspection machine, and there is no need for moving or looking at the faceplate in the assembly machine. Therefore, the assembly machine can take the simple form illustrated in FIGS. 13*a*–13*f*, except for the addition of a laterally movable carrier for mounting the servo motors in the case of the second approach.

The methods described up to this point are all based on the assumption that the grille (screen) may be displaced from its nominal position, but that it has the correct size and shape, so that a mask stretched to conform to the standard geometry will always fit the grille, provided only that any relative displacements are corrected.

ADJUSTING MASK SHAPE TO A PARTICULAR SCREEN

The possibility of screen patterns being too large or too small, or having distortions such as indicated in FIG. 14*b*, cannot be ruled out. It is in the nature of the stretchable mask that it can compensate for small departures from the correct size and shape of the grille pattern. But to take advantage of this characteristic, the principle of stretching the mask to conform to a predetermined standard position and geometry must be replaced by the idea of stretching it to conform to an individual grille. When a screen inspection machine measures more than two points (for example, the four corners) on a displaced but undistorted grille, certain geometrical relationships exist between the measured data. For example, the horizontal displacements of the two upper corners are the same. Three independent measurements (for example, the vertical displacement of each upper corner and their common horizontal displacement) suffice to specify translation of the upper edge in x and y, as well as rotation. Measuring x and y displacement of all four corners provides welcome redundancy, which permits more accurate computation of the translational components of a chosen point (e.g., the center of the rectangle) as well as the rotation, using simple algorithms.

If the screen is not only displaced but also distorted, these algorithms can still be used to compute the translational and rotational components for the purpose of moving the faceplate or the mask to achieve compensation; but of course, such compensation will not be perfect because the distortion component is still present.

On the other hand, the last approach outlined in the preceding section, where the feedback loops are biased in accordance with grille position error signals derived from the screen inspection machine, will automatically cause the mask to depart from the standard geometry and to be stretched so as to at least partly compensate for screen distortion. Suppose, for example, that the grille is distorted as indicated in FIG. 14*b*, i.e., too long in the horizontal direction; then the horizontal displacements of the two upper corners will not be alike, the right top corner yielding a larger positive (or smaller negative) value of Xg than the left top corner. The two bias voltages (or digital bias signals) supplied to the left and right servo motors will therefore be different, causing the motors to come to rest in positions which stretch the mask more than the usual amount to compensate for the excess length of the grille.

The procedure just described represents an intermediate step between stretching the mask to conform to a standard position and geometry, and stretching it to conform to an individual grille: The mask is stretched to conform to the standard, but grille information is fed into the feedback loops to correct for the particular grille. This seems a roundabout approach, and it raises the question to what extent a standard is really needed in this embodiment.

FIG. 23 shows an assembly machine which is a simplified version of the machine shown in FIGS. 21*a* and 21*b*: the adjustable half-balls 321 included in FIGS. 21*a* and 21*b* are replaced by fixed half-balls. In the design of the upper sensors of optical device 342, which measure mask position errors with reference to a mask standard, and lower sensors of optical device 344, which measure grille position errors with reference to a grille standard, care is taken to make sure that equal position errors produce equal error voltages (or equal digital signals) from both sets of sensors. The sensor outputs are then connected into the difference-forming circuit of FIG. 22, and the outputs from this circuit are used to control the mask servo motors. When the servos come to rest, the mask fits the grille—distorted or undistorted—as well as is possible within the mechanical limitations of the system.

The common mounting of a pair of sensors (342 and 344) on a rigid shaft 340 is advantageous because the output signal from the difference-forming circuit (FIG. 22) is not sensitive to simultaneous displacement of both sensors by equal amounts.

FIGS. 24*a* and 24*b* indicate a more direct approach to developing error signals which indicate directly differences between mask and grille, by measuring the positions of selected points in the mask directly with reference to corresponding points on an individual grille. The arrangement of FIGS. 24*a*–24*c* modifies the assembly machine of FIGS. 13*a*–13*f*. No mask or grille standard is used. Specifically, FIGS. 24*a* and 24*b* indicate a point-like light source 302, preferably a gallium arsenide diode laser, illuminating two round apertures 304 (shown greatly magnified in FIG. 24*c*) in the peripheral region of the mask near support structure 3*a* outside the viewing area. Light passing through the two apertures strikes the black grille 306. The grille has a rectangular window 308 so positioned that when screen and mask are properly aligned, one-half the light passing through each of the two mask apertures 304 will also pass through the window. FIG. 24*c* illustrates the case where the screen, and thus window 308, is displaced to the left; as a consequence, more light from the left aperture than from the right now passes through the window. A balanced photodetector 310, consisting of two separate photodetectors connected in push-pull, is placed below the faceplate to develop an electrical output indicative of the unbalance, thus producing a position error signal. No difference-forming circuit of the type shown in FIG. 22 is needed here, since a difference signal is produced directly by the optical arrangement shown in FIGS. 24*a* and 24*b*.

The size of apertures 304 of window 308 depends on the magnitude of the expected initial screen-positioning errors of the mask relative to the grille. Space along the edge of the viewing area is at a premium; therefore, the apertures and window should not be made larger than necessary. A lower limit for the aperture size is set by the appearance of diffraction effects which tend to blur the shadow of the aperture edge on the grille.

If there is not enough space available between the viewing area and support structure 3A, apertures 304 and window 308 may be placed outside the support structure, as shown in FIG. 24*b*. The mode of operation is the same as that discussed in connection with FIG. 24*a*.

FIGS. 24*a* and 24*b* show the beam of light from source 302 striking apertures 304 under an angle $\alpha$. It is preferred to make this angle, or at least its projection on a plane which contains the light source as well as the centers of apertures 304, substantially equal to the corresponding angle formed by the incident electron beams in the completed tube. This has the advantage that errors in the height of support structure 3A are compensated for; for example, if the support structure is too low, the shadow of apertures 304 will move to the right as shown in FIG. 24*c* and produce an error signal which calls for additional stretching of the mask.

The assembly procedure is analogous to that described in connection with FIGS. 13*a*–13*f* with the following changes: In the step depicted FIG. 13*c*, a plain bottom plate is substituted for the optics-equipped plate 91, simply to support the mask before it is clamped. After clamping, the bottom plate is withdrawn, a faceplate is inserted as in FIG. 13*f*; the optical components (which had to be moved out of the way to insert mask and faceplate) are put in their proper positions and the servo circuits are turned on. All mask positioning and stretching is done with reference to the grille; the clamp motors are controlled by the signals derived from balanced photodetectors 310, either individually (one motor—one photodetector), or preferably, collectively through the matrixing process described in connection with FIG. 12.

It was mentioned earlier that simple algorithms exist for extracting the translational and rotational components from measured displacements at selected points.

This applies whether the displacements refer to mask vs. standard, grille vs. standard, or mask vs. grille. In all cases, the translational and rotational components may be compensated for by displacing the mask, the grille, or both. More specifically, the mask may be moved entirely by activating the clamp motors, or by mounting these motors on a carrier capable of translation and rotation in the x-y plane for mask position adjustments. The grille may be moved by the micrometer screws illustrated in several embodiments, or by other means capable of translating and rotating the faceplate in the x-y plane. These operations may be carried out in a closed-loop or open-loop mode. Selection of a particular combination is a matter of design choice.

In the foregoing, it has been shown how a mask may be positioned and stretched so that its pattern attains a desired relation to a screen. The above discussion includes:

I. Stretching and positioning the mask, and positioning the screen, to conform to a common standard.

A. If the screen is known to be undistorted (that is, to have a "standard" geometry) and correctly positioned on the panel, by positioning and stretching the mask to conform to the predetermined standard mask position and geometry;

B. If the screen is known to be undistorted but not necessarily correctly positioned on the panel, by 1. providing an adjustable fixture (FIG. 15) for handling the panel which is independent of the assembly machine, inspecting screen position in a separate screen inspection machine (FIG. 17) and, through feedback (FIG. 16), adjusting the fixture, or 2. providing adjustment capability in the assembly machine (FIG. 20), with the information required to make the adjustment derived a. from a separate screen inspection machine (FIG. 19), or b. from screen inspection performed in the assembly machine itself (FIGS. 21*a* and 21*b*).

In all these cases, the panel is moved to correct for screen position errors, and the mask is positioned and stretched to conform to a standard position and geometry.

II. Conforming the mask to the screen

Another class of solutions shares the common feature that the mask is positioned and stretched—not to conform to a standard, but rather so as to reduce the differences between corresponding points on a particular mask and screen to a minimum (FIG. 22). This may be done by A. Inspecting the screen in a separate machine (FIG. 19) to measure screen departures (Xg) from a standard position and geometry; in the assembly machine, measure mask departures (Xm) from the standard position and geometry; move and stretch mask to minimize $Xm-Xg$ (FIG. 22).

B. Inspecting mask and screen simultaneously in an assembly machine; reduce difference between corresponding points to the minimum. This may be accomplished:

1. Separate optical systems may be employed to measure mask and screen position (FIGS. 23*a* and 23*b*), with the difference formed electronically (FIG. 22), or 2. A single optical system joining mask and screen may be used, with the difference formed optically (FIGS. 24*a* and 24*b*). No standard reference is used.

A number of approaches for eliminating or alleviating the effect of screen errors have been described. It will be understood that these alternatives are comprised of individual steps which permit other combinations in addition to those described.

While a particular embodiment of the invention has been shown and described, it will be readily apparent to those skilled in the art that changes and modifications may be made in the inventive means and method without departing from the invention in its broader aspects, and therefore, the aim of the appended claims is to cover all such changes and modifications as fall within the true spirit and scope of the invention.

What is claimed is:

1. For use in the manufacture of a color cathode ray tube having a shadow mask with a central pattern of apertures mounted in tension on a transparent flat front panel with the mask aperture pattern in registration with a cathodoluminescent screen pattern of corresponding geometry and position on an inner surface of the panel, wherein the shadow masks and front panels are respectively interchangeable, the method steps, not necessarily in the stated order, comprising:

expanding and positioning a mask such that its aperture pattern assumes a predetermined mask reference position and a predetermined mask reference geometry corresponding to a standardized screen pattern geometry;

adjustably positioning a front panel having a screen pattern with said standardized geometry such that said screen pattern assumes a screen reference position corresponding to said predetermined mask reference position of said mask pattern; and securing said mask to said panel under tension with said mask and screen patterns conforming in geometry and position.

2. The method defined by claim 1 including providing panel position adjustment means for selectively adjustably positioning said panel, said method including utilizing said adjustment means to effect said positioning of said panel.

3. The method defined by claim 2 wherein said panel position adjustment means has three panel positioning means spaced along two adjacent sides of a panel for engaging and locating a contained panel, and wherein said positioning of said panel is accomplished by adjusting the position of one or more of said three panel positioning means.

4. The method defined by claim 2, including measuring a panel screen pattern and developing data indicative of the position of said screen pattern which is correlated directly or indirectly with said predetermined screen reference position, and using said data to adjust the position of said panel in said panel position adjustment fixture means.

5. The method defined by claim 2 including providing mask assembly means including means for accomplishing said expanding and positioning of said mask and for securing said mask to said panel, and wherein said selectively adjustable positioning of said panel is accomplished in said mask assembly means prior to securing said mask to said panel.

6. The method defined by 5 wherein said panel position adjustment means has three panel positioning means spaced along two adjacent sides of a panel for engaging and locating a contained panel, and wherein said positioning of said panel is accomplished by adjusting the position of one or more of said three panel positioning means.

7. The method defined by claim 5 including measuring a panel screen pattern and developing data indicative of the position of said screen pattern which is correlated directly or indirectly with said predetermined screen reference position, and using said data to adjust the position of said panel and said panel position adjustment means.

8. The method defined by claim 7 wherein said data indicative of the position of the screen pattern is developed in said mask assembly means.

9. The method defined by claim 7 wherein said data indicative of the position of said screen pattern is developed in separate screen measuring means.

10. The method defined by claim 2 including providing mask assembly means including means for accomplishing said expanding and positioning of said mask and for securing said mask to said panel, wherein said selectively adjustable positioning of said panel is accomplished outside said mask assembly means prior to insertion therein.

11. The method defined by claim 10 wherein said panel position adjustment means has three panel positioning means spaced along two adjacent sides of a panel for engaging and locating the contained panel, and wherein said positioning of said panel is accomplished by adjusting the position of one or more of said three panel positioning means.

12. The method defined by claim 10 including measuring a panel screen pattern and developing data indicative of the position of said screen pattern which is correlated directly or indirectly with said predetermined screen reference position, and using said data to adjust the position of said panel in said panel position adjustment means.

13. The method defined by claim 1 wherein said expanding constitutes mechanically stretching said mask.

14. For use in the manufacture of a color cathode ray tube having a shadow mask with a central pattern of apertures mounted in tension on a transparent flat front panel with the mask aperture pattern in registration with a cathodoluminescent screen pattern of corresponding geometry and position on an inner surface of the panel, wherein the shadow masks and front panels are respectively interchangeable, the method steps, not necessarily in the stated order, comprising:

measuring a panel screen pattern position and developing screen position error data containing information indicative of position errors of said screen pattern relative to a predetermined screen reference position;

responsive to said screen position error data, expanding and positioning a mask such that its aperture pattern assumes a position corresponding to said screen pattern position; and securing said mask to said panel under tension with said mask and screen patterns in position registry.

15. The method defined by claim 14 including providing mask assembly means including means for accomplishing said expanding and positioning of said mask and for securing said mask to said panel, and wherein said position error data is developed independently of said mask assembly means for later use in said mask assembly means prior to said securing of said mask to said panel.

16. For use in the manufacture of a color cathode ray tube having a shadow mask with a central pattern of apertures mounted in tension on a transparent flat front panel with the mask aperture pattern in registration with a cathodoluminescent screen pattern of corresponding geometry and position on an inner surface of the panel, wherein the shadow masks and front panels are respectively interchangeable, the method steps, not necessarily in the stated order, comprising:

measuring a panel screen pattern and developing screen position and geometry error data containing information indicative of position and geometry errors of said screen pattern relative to a predetermined screen reference position and geometry;

responsive to said screen error data, expanding and positioning a mask such that its aperture pattern assumes a position and geometry corresponding to said screen position and geometry; and securing said mask to said panel under tension with said mask and screen patterns registered in geometry and position.

17. For use in the manufacture of a color cathode ray tube having a shadow mask with a central pattern of apertures mounted in tension on a transparent flat front panel with the mask aperture pattern in registration with a cathodoluminescent screen pattern of corresponding geometry and position on an inner surface of the panel, wherein the shadow masks and front panels are respectively interchangeable, the method steps, not necessarily in the stated order, comprising:

measuring a panel screen pattern and developing screen position error data indicative of position errors of said screen pattern relative to a predetermined screen reference position;

measuring a mask aperture pattern and developing mask aperture position error data containing information indicative of position errors of said aperture pattern relative to a predetermined mask reference position;

responsive to said screen position error data and said mask aperture position error data, expanding and positioning a mask to optimize the position registry of said mask and screen patterns; and securing said mask to said panel under tension with said mask and screen patterns in position registry.

18. The method defined by claim 17 including providing mask assembly means having means for accomplishing said expanding and positioning of said mask and for securing said mask to said panel, method further including providing position measuring equipment for measuring a panel screen pattern and mask aperture pattern and developing said screen and aperture position error data, and wherein said data is used in said mask assembly means to adjust the position of said mask to achieve said optimized mask-screen position registry.

19. For use in the manufacture of a color cathode ray tube having a shadow mask with a central pattern of apertures mounted in tension on a transparent flat front panel with the mask aperture pattern in registration with a cathodoluminescent screen pattern of corresponding geometry and position on an inner surface of the panel, wherein the shadow masks and front panels are respectively interchangeable, the method steps, not necessarily in the stated order, comprising:

mechanically stretching and positioning a mask such that its aperture pattern assumes a predetermined mask reference position and a predetermined mask reference geometry corresponding to a standardized screen pattern geometry;

positioning a front panel having a screen pattern with said standardized geometry such that said screen pattern assumes a screen position which may vary from a screen reference position by position errors, adjusting the position of said mask relative to said panel to compensate for said screen position errors said adjusting including measuring a panel screen pattern and developing data containing information indicative of said position errors of said screen pattern and subsequently using said data to adjust the position of said mask; and securing said mask to said panel under tension with said mask and screen patterns conforming in geometry and position.

20. For use in the manufacture of a color cathode ray tube having a shadow mask with a central pattern of apertures mounted in tension on a transparent flat front panel with the mask aperture pattern in registration with a cathodoluminescent screen pattern of corresponding geometry and position on an inner surface of the panel, wherein the shadow masks and front panels are respectively interchangeable, a method for adjusting the position of said front panel prior to attachment of said mask thereto, comprising:

providing frame means defining a rectangular panel-receiving receptacle having three stop means, two positioned along one side of said panel-receiving receptacle for engaging one side of a received panel and the third stop means being positioned on an adjacent side of said receptacle for engaging a corresponding adjacent side of said panel for defining the position of a panel placed in said frame therein; and adjusting the relative positions of said stop means to alter the position of a panel received in said receptacle.

21. For use in the manufacture of a color cathode ray tube having a shadow mask with a central pattern of apertures mounted in tension on a transparent flat front panel with the mask aperture pattern in registration with a cathodoluminescent screen pattern of corresponding geometry and position on an inner surface of the panel, wherein the shadow masks and front panels are respectively interchangeable, the method comprising:

supporting a mask in tension adjacent to a screen panel;

determining the position or geometry of said mask pattern and developing first error signals containing information indicative of the position or geometry of said mask aperture pattern;

determining the position or geometry of said screen pattern and developing second error signals containing information indicative of the position or geometry of said screen pattern; and responsive to said first and second error signals, adjusting the relative positions of said mask and screen to optimize registration of said mask and screen pattern.

22. The method defined by claim 21 including securing said mask to said panel after said optimization of registry of said mask and screen patterns.

23. The method defined by claim 21 wherein said adjusting includes mechanically stretching said mask to conform said mask pattern to said screen pattern in geometry and translating and rotating said mask to conform said mask and screen patterns in position to achieve said registry therebetween.

24. For use in the manufacture of a color cathode ray tube having a shadow mask with a central pattern of apertures mounted in tension on a transparent flat front panel, with the mask aperture pattern in registration with a cathodoluminscent screen pattern of corresponding geometry and position on an inner surface of the panel, and wherein the shadow masks and front panels are respectively interchangeable, a process comprising:

providing a faceplate having on its inner surface a predetermined cathodoluminescent screen pattern;

providing a universal faceplate holding fixture having adjustable A-B-C reference points;

loading said faceplate into said holding fixture and adjusting said A-B-C reference points to move said faceplate into a predetermined position with respect to said fixture;

placing said holding fixture and said faceplate into contiguity with a tensed foil shadow mask whose aperture pattern is conformed into registry with said predetermined cathodoluminscent screen pattern; and affixing said mask to said faceplate with said mask and screen patterns registered.

25. The process according to claim 24 wherein said A-B-C reference points are adjusted by stepping motors responsive to faceplate-position-corrective feedback signals.

26. The process according to claim 25 wherein said stepping motors actuate micrometer screws linked to said A-B-C points for precision adjustment of said points.

27. For use in the manufacture of a color cathode ray tube having a shadow mask with a central pattern of apertures mounted in tension on a transparent flat front panel, with the mask aperture in registration with the apertures of a grille pattern of corresponding geometry and position on the inner surface of the panel, and wherein the shadow masks and front panels are respectively interchangeable, a process comprising:

providing a faceplate having on its inner surface a predetermined pattern of grille holes;

providing a screen inspection fixture having three faceplate stops, and installing said faceplate therein;

projecting a light source through said faceplate and said grille holes to develop patterns corresponding to the grille configuration in a small selected region;

viewing said patterns with a video-camera-equipped microscope for developing information indicative of the x and y coordinates of the centers of said grille holes; and storing the information in a computer for later transfer to a mask-panel assembly machine.

28. For use in the manufacture of a color cathode ray tube having a shadow mask with a central pattern of apertures mounted in tension on a transparent flat front panel, with the mask aperture pattern in registration with the apertures of a grille pattern of corresponding geometry and position on the inner surface of the panel, and wherein the shadow masks and front panels are respectively interchangeable, a process comprising:

providing an assembly machine having three adjustable stops for receiving said faceplate;

developing information indicative of the coordinates of selected apertures of said grille pattern;

further developing information indicative of the coordinates of selected mask apertures;

combining the two sets of coordinate information and computing therefrom instructions for adjusting said faceplate stops so as to bring the mask and grille into registry.

29. For use in the manufacture of a color cathode ray tube having a shadow mask with a central pattern of apertures mounted in tension on a transparent flat front panel with the mask aperture pattern in registration with a cathodoluminescent screen pattern of corresponding geometry and position on an inner surface of the panel, wherein the shadow masks and front panels are respectively interchangeable, the apparatus comprising:

means for measuring a panel screen pattern position and developing screen position error data containing information indicative of position errors of said screen pattern relative to a predetermined screen reference position;

means responsive to said screen position error data, for expanding and positioning a mask such that its aperture pattern assumes a position corresponding to said screen pattern position; and means for securing said mask to said panel under tension with said mask and screen patterns in position registry.

30. For use in the manufacture of a color cathode ray tube having a shadow mask with a central pattern of apertures mounted in tension on a transparent flat front panel with the mask aperture pattern in registration with a cathodoluminescent screen pattern of corresponding geometry and position on an inner surface of the panel, wherein the shadow masks and front panels are respectively interchangeable, the apparatus comprising:

means for measuring a panel screen pattern and developing screen position error data indicative of position errors of said screen pattern relative to a predetermined screen reference position;

means for measuring a mask aperture pattern and developing mask aperture position error data containing information indicative of position errors of said aperture pattern relative to a predetermined mask reference position;

means responsive to said screen position error data and said mask aperture position error data for expanding and positioning a mask to optimize the position registry of said mask and screen patterns; and means for securing said mask to said panel under tension with said mask and screen patterns in position registry.

31. For use in the manufacture of a color cathode ray tube having a shadow mask with a central pattern of apertures mounted in tension on a transparent flat front panel with the mask aperture pattern in registration with a cathodoluminescent screen pattern of corresponding geometry and position on an inner surface of the panel, wherein the shadow masks and front panels are respectively interchangeable, the apparatus comprising:

means for expanding and positioning a mask such that its aperture pattern assumes a predetermined mask reference position and a predetermined mask reference geometry corresponding to a standardized screen pattern geometry;

means for adjustably positioning a front panel having a screen pattern with said standardized geometry such that said screen pattern assumes a screen reference position corresponding to said predetermined mask reference position of said mask pattern; and means for securing said mask to said panel under tension with said mask and screen patterns conforming in geometry and position.

32. The apparatus defined by claim 31 including panel position adjustment fixture means for selectively adjustably positioning said panel.

33. The apparatus defined by claim 32 wherein said panel position adjustment fixture means has three panel positioning means spaced along two adjacent sides of a panel for engaging and repeatably locating a contained panel, and wherein said positioning of said panel is accomplished by adjusting the position of one or more of said three panel positioning means.

34. The apparatus defined by claim 32, including means for measuring a panel screen pattern and developing data indicative of the position of said screen pattern which is correlated directly or indirectly with said predetermined screen reference position, said data being used to adjust the position of said panel in said panel position adjustment fixture means.

35. The apparatus defined by claim 32 including mask assembly means having means for said expanding and positioning of said mask and for securing said mask to said panel, said selectively adjustable positioning of said panel being accomplished in said mask assembly means prior to securing said mask to said panel.

36. The method defined by 35 wherein said panel position adjustment fixture means has three panel positioning means spaced along two adjacent sides of a panel for engaging and repeatably locating a contained panel, and wherein said means for positioning said panel adjusts the position of one or more of said three panel positioning means.

37. For use in the manufacture of a color cathode ray tube having a shadow mask with a central pattern of apertures mounted in tension on a transparent flat front panel with the mask aperture pattern in registration with a cathodoluminescent screen pattern of corresponding geometry and position on an inner surface of the panel, wherein the shadow masks and front panels are respectively interchangeable, the apparatus comprising:

means for supporting a mask in tension adjacent to a screen panel;

mask pattern inspection means for determining the position or geometry of said mask pattern and for developing first error signals containing information indicative of the position or geometry of said mask aperture pattern;

screen pattern inspection means for determining the position or geometry of said screen pattern and for developing second error signals containing information indicative of the position or geometry of said screen pattern; and means responsive to said first and second error signals for adjusting the relative positions of said mask and screen to optimize registration of said mask and screen pattern.

38. The apparatus defined by claim 37 including means for securing said mask to said panel after said optimization of registry of said mask and screen patterns.

39. The apparatus defined by claim 37 wherein said means for adjusting includes means for mechanically stretching said mask to conform said mask pattern to said screen pattern in geometry and for translating and rotating said mask to conform said mask and screen patterns in position to achieve said registry therebetween.

40. The apparatus defined by claim 37 wherein said mask pattern inspection means and said screen pattern inspection means each comprise microscope means and associated television camera means.

41. The apparatus defined by claim 39 wherein said means for adjusting further includes three adjustably positionable stop means—two along one panel side and the third along the adjacent panel side, for translating or rotating said panel to conform said mask and screen patterns in position.

* * * * *